US010235362B1

(12) United States Patent
Boynes et al.

(10) Patent No.: US 10,235,362 B1
(45) Date of Patent: Mar. 19, 2019

(54) CONTINUOUS TRANSLATION REFINEMENT WITH AUTOMATED DELIVERY OF RE-TRANSLATED CONTENT

(71) Applicant: Amazon Technologies, Inc., Seattle, WA (US)

(72) Inventors: Jeremy Boynes, Mercer Island, WA (US); Paul Christopher Cerda, Snohomish, WA (US); Paul Kasper, Bothell, WA (US); Thibault Pierre Seillier, Seattle, WA (US); Kelly Duggar Wiggins, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/279,025

(22) Filed: Sep. 28, 2016

(51) Int. Cl.
*G06F 17/00* (2006.01)
*G06F 17/28* (2006.01)

(52) U.S. Cl.
CPC ........ *G06F 17/2854* (2013.01); *G06F 17/289* (2013.01)

(58) Field of Classification Search
CPC ............... G06F 17/289; G06F 17/2827; G06F 17/2247; G06F 17/211; G06F 17/3089; G06F 17/2288; G06F 17/2836; G06F 17/2872; G06F 17/2854; G10L 15/005; G10L 15/1822
See application file for complete search history.

(56) References Cited

U.S. PATENT DOCUMENTS

| | | |
|---|---|---|
| 5,161,105 A | 11/1992 | Kugimiya et al. |
| 5,546,304 A | 8/1996 | Marschner et al. |
| 5,737,617 A | 4/1998 | Bernth et al. |
| 5,768,603 A | 6/1998 | Brown et al. |
| 5,960,080 A | 9/1999 | Fahlman et al. |
| 6,278,969 B1 | 8/2001 | King et al. |
| 6,446,036 B1 | 9/2002 | Bourbonnais et al. |
| 6,470,306 B1 | 10/2002 | Pringle et al. |
| 6,623,529 B1 | 9/2003 | Lakritz |
| 6,658,627 B1 | 12/2003 | Gallup et al. |

(Continued)

OTHER PUBLICATIONS

Offic Action for U.S. Appl. No. 15/278,788, dated Oct. 20, 2017, Wiggins, "Leveraging Content Dimensions During the Translation of Human-Readable Languages", 12 pages.

(Continued)

*Primary Examiner* — Abdelali Serrou
(74) *Attorney, Agent, or Firm* — Lee & Hayes, P.C.

(57) ABSTRACT

A content management system (CMS) and a translation management system (TMS) can utilize content dimensions for content items to manage and translate the content items between languages. Machine and human translations of complex dynamic content can also be improved by pre-rendering the content to remove localization-related syntax prior to machine or human translation. Content items can also be scored as to their suitability for localization prior to translation, and translation can be skipped for content items that do not have a sufficiently high score. Semantic and natural language processing (NLP) techniques can also be utilized for content categorization and routing. Translations of content items can also be continuously refined and higher quality re-translated content can be provided in an automated fashion.

20 Claims, 14 Drawing Sheets

(56) References Cited

U.S. PATENT DOCUMENTS

| | | | |
|---|---|---|---|
| 7,174,289 B2 | 2/2007 | Sukehiro | |
| 7,533,013 B2* | 5/2009 | Marcu | G06F 17/271 704/2 |
| 7,580,830 B2 | 8/2009 | Al-Onaizan et al. | |
| 7,856,352 B2* | 12/2010 | Godoy | G06F 17/289 704/8 |
| 7,860,706 B2* | 12/2010 | Abir | G06F 17/2872 704/4 |
| 7,925,494 B2* | 4/2011 | Cheng | G06F 17/2836 704/3 |
| 8,249,854 B2* | 8/2012 | Nikitin | G06F 17/289 704/2 |
| 8,380,486 B2 | 2/2013 | Soricut et al. | |
| 8,566,710 B2 | 10/2013 | Travieso et al. | |
| 8,635,059 B2* | 1/2014 | Estelle | G06F 17/2818 704/2 |
| 8,706,474 B2 | 4/2014 | Blume et al. | |
| 8,761,513 B1* | 6/2014 | Rogowski | G06F 17/2854 382/181 |
| 8,874,431 B2* | 10/2014 | Abir | G06F 17/2809 704/1 |
| 8,886,517 B2 | 11/2014 | Soricut et al. | |
| 9,495,425 B1 | 11/2016 | Kuznetsov | |
| 9,514,294 B1 | 12/2016 | Hepburn et al. | |
| 9,563,625 B2* | 2/2017 | Bangalore | G06F 17/2836 |
| 9,684,653 B1 | 6/2017 | Bhagat | |
| 9,690,777 B1 | 6/2017 | Sotelo et al. | |
| 9,747,283 B2* | 8/2017 | Rottmann | G06F 17/2854 |
| 9,805,029 B2* | 10/2017 | Rottmann | G06F 17/2854 |
| 2001/0029455 A1 | 10/2001 | Chin et al. | |
| 2002/0152063 A1 | 10/2002 | Tokieda et al. | |
| 2002/0169592 A1 | 11/2002 | Aityan | |
| 2002/0188435 A1 | 12/2002 | Labarge | |
| 2003/0140316 A1 | 7/2003 | Lakritz | |
| 2003/0176995 A1 | 9/2003 | Sukehiro | |
| 2004/0205671 A1 | 10/2004 | Sukehiro et al. | |
| 2005/0055217 A1* | 3/2005 | Sumita | G06F 17/2818 704/277 |
| 2006/0015320 A1* | 1/2006 | Och | G06F 17/2818 704/2 |
| 2006/0100847 A1 | 5/2006 | McEntee et al. | |
| 2006/0200339 A1 | 9/2006 | Satake et al. | |
| 2006/0200766 A1 | 9/2006 | Lakritz | |
| 2006/0206304 A1 | 9/2006 | Liu | |
| 2006/0293893 A1 | 12/2006 | Horvitz | |
| 2007/0011132 A1 | 1/2007 | Zhou et al. | |
| 2007/0168450 A1 | 7/2007 | Prajapat et al. | |
| 2007/0255550 A1 | 11/2007 | Menezes et al. | |
| 2007/0294076 A1 | 12/2007 | Shore et al. | |
| 2008/0189257 A1 | 8/2008 | Wiseman et al. | |
| 2008/0249760 A1 | 10/2008 | Marcu et al. | |
| 2008/0270979 A1* | 10/2008 | McCool | G06F 8/36 717/108 |
| 2009/0002569 A1 | 1/2009 | Matsukura et al. | |
| 2009/0024383 A1* | 1/2009 | Shiratori | G06F 17/2836 704/4 |
| 2009/0132230 A1* | 5/2009 | Kanevsky | G06F 17/289 704/2 |
| 2009/0192783 A1 | 7/2009 | Jurach, Jr. et al. | |
| 2009/0204385 A1 | 8/2009 | Cheng et al. | |
| 2009/0319257 A1 | 12/2009 | Blume et al. | |
| 2010/0235162 A1* | 9/2010 | Faddoul | G06F 17/2818 704/6 |
| 2011/0015919 A1 | 1/2011 | Rosart et al. | |
| 2012/0016655 A1 | 1/2012 | Travieso et al. | |
| 2012/0123765 A1 | 5/2012 | Estelle et al. | |
| 2012/0185235 A1 | 7/2012 | Albat | |
| 2012/0221319 A1* | 8/2012 | Trese | G06F 17/2836 704/2 |
| 2012/0253785 A1 | 10/2012 | Hamid et al. | |
| 2012/0284015 A1 | 11/2012 | Drewes | |
| 2012/0303352 A1 | 11/2012 | Coen et al. | |
| 2013/0090915 A1 | 4/2013 | Clark | |
| 2013/0185049 A1 | 7/2013 | Zhao et al. | |
| 2014/0089382 A1 | 3/2014 | Wang et al. | |
| 2014/0114642 A1 | 4/2014 | van den Oever et al. | |
| 2014/0163951 A1 | 6/2014 | Nikoulina et al. | |
| 2014/0297256 A1* | 10/2014 | Rogowski | G06F 17/289 704/2 |
| 2015/0286632 A1* | 10/2015 | Meunier | G06F 17/2854 704/2 |
| 2015/0324336 A1 | 11/2015 | Glezos et al. | |
| 2016/0085746 A1* | 3/2016 | Ni | G06F 17/289 704/2 |
| 2016/0124944 A1 | 5/2016 | Andreoli et al. | |
| 2016/0171050 A1* | 6/2016 | Das | G06F 17/30976 707/714 |
| 2016/0179789 A1 | 6/2016 | Chen et al. | |
| 2016/0203128 A1 | 7/2016 | Bangalore et al. | |
| 2016/0267077 A1* | 9/2016 | Bahgat | G06F 17/2854 |
| 2016/0321160 A1 | 11/2016 | Joo et al. | |
| 2016/0371256 A1 | 12/2016 | Mauser et al. | |
| 2017/0169015 A1* | 6/2017 | Huang | G06F 17/2872 |
| 2017/0185586 A1* | 6/2017 | Rottmann | G06F 17/289 |
| 2017/0185588 A1* | 6/2017 | Rottmann | G06F 17/2854 |
| 2017/0371868 A1* | 12/2017 | Zhang | G06F 17/2854 |

OTHER PUBLICATIONS

Office Action for U.S. Appl. No. 15/278,869, dated Dec. 15, 2017, Cerda, "Semantic and Natural Language Processing for Content Categorization and Routing", 10 pages.

"CLDR—Unicode Common Locale Data Repository," retrieved from <<http://cldr.unicode.org/>>, available as early as Sep. 19, 2016, retrieved on Dec. 20, 2017, 5 pages.

"ICU—International Components for Unicode," retrieved from <<http://site.icu-project.org/>>, available as early as Sep. 19, 2016, retrieved on Dec. 20, 2017, 4 pages.

Bernth, et al., "MTranslatability", Machine Translation, vol. 16, Issue 3, Sep. 2001, pp. 175-218.

O'Brien, "Machine-Translatability and Post-Editing Effort: An Empirical Study using Translog and Choice Network Analsyis", Dublin City University, May 2006, 206 pages.

Office Action for U.S. Appl. No. 15/278,840, dated May 16, 2018, Kasper, "Source Language Content Scoring for Localizability", 17 pages.

Office Action for U.S. Appl. No. 15/278,735, dated May 17, 2018, Seillier, "Abstraction of Syntax in Localization through Pre-Rendering", 22 pages.

Roturier, "Assessing a set of Controlled Language rules: Can they improve the performance of commercial Machine Translation systems?", Proceedings of the International Conference Translating and the Computer, vol. 26, Dec. 2004, 14 pages.

Office Action for U.S. Appl. No. 15/278,788, dated Jul. 17, 2018, Wiggins, "Leveraging Content Dimensions During the Translation of Human-Readable Languages", 16 pages.

Bernth, et. al., "The Effect of Source Analysis on Translation Confidence", Envisioning Machine Translation in the Information Future (2000), Oct. 2000, pp. 89-99.

Office Action for U.S. Appl. No. 15/278,735, dated Jan. 17, 2018, Seillier, "Abstraction of Syntax in Localization through Pre-Rendering", 15 pages.

Office Action for U.S. Appl. No. 15/278,840, dated Jan. 17, 2018, Kasper, "Source Language Content Scoring for Localizability", 12 pages.

Office Action for U.S. Appl. No. 15/278,788, dated Feb. 7, 2018, Wiggins, "Leveraging Content Dimensions During the Translation of Human-Readable Languages", 15 pages.

Office Action for U.S. Appl. No. 15/278,869, dated Apr. 9, 2018 Cerda, "Semantic and Natural Language Processing for Content Categorization and Routing", 20 pages.

Underwood, et. al., "Translatability Checker: A Tool to Help Decide Whether to Use MT", Proceedings of MT Summit VIII: Machine Translation in the Information Age, Jan. 2001, 6 pages.

(56) References Cited

OTHER PUBLICATIONS

Office Action for U.S. Appl. No. 15/278,869, dated Aug. 29, 2018, Cerda, "Semantic and Natural Language Processing for Content Categorization and Routing", 17 pages.

* cited by examiner

CONTINUOUS TRANSLATION REFINEMENT WITH AUTOMATED DELIVERY OF RE-TRANSLATED CONTENT

BACKGROUND

Various systems exist for managing content, such as text strings. These systems are commonly referred to as content management systems. Systems also currently exist for managing the human or machine translation of content contained in content management systems. These systems are commonly referred to as translation management systems. Various technical inefficiencies currently exist when utilizing content management systems and translation management systems together.

The disclosure made herein is presented with respect to these and other considerations.

DETAILED DESCRIPTION

Figure 1:
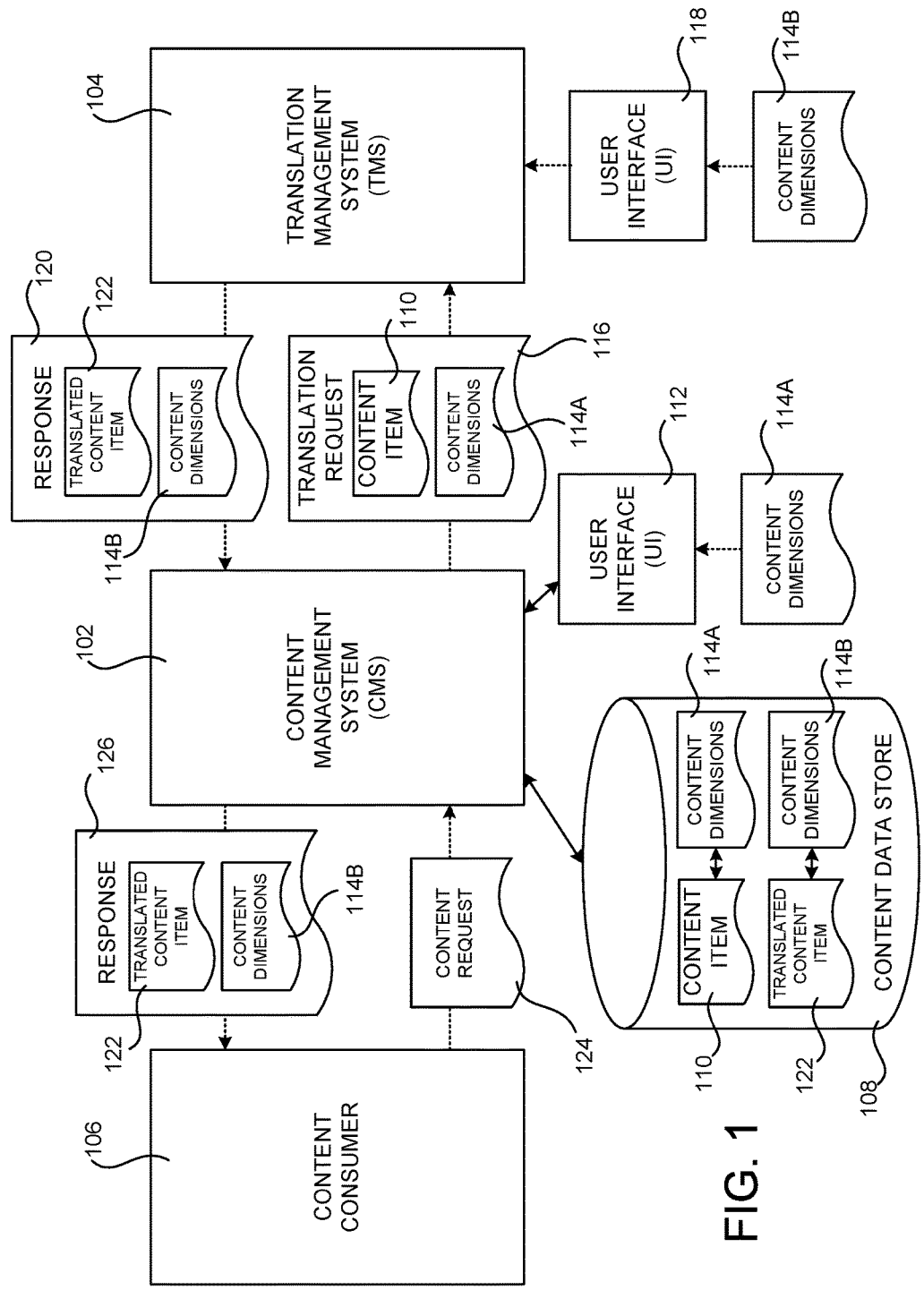
FIG. 1 is a computing system architecture diagram showing aspects of a computing system configured to provide functionality for leveraging content dimensions during the translation of human readable languages, according to one particular configuration.

The following detailed description is directed to technologies for leveraging content dimensions during language translation of content items, like strings of text. In particular, this patent application relates to providing functionality at a content management system ("CMS") for associating content dimensions with content items. The content dimensions can be provided to a translation management system ("TMS") for use in translating the content items between human readable languages. In particular, the content dimensions can be used as context that will inform the translation process, thereby allowing higher quality translations to be provided.

Fallback content dimensions can also be specified in the CMS. The fallback content dimensions can be utilized at runtime when fetching content items for content consumers. If a content item does not exist for a particular string and content dimension, then another content item having the fallback content dimension can be returned. This can save significant storage space as compared to current content management systems.

The following detailed description is also directed to technologies for improving the translations of complex dynamic content by pre-rendering the content to remove localization-related syntax prior to machine or human translation. In particular, content items having localization-specific syntax (e.g. International Component for Unicode ("ICU") message pattern strings) are pre-rendered to remove the localization-specific syntax. The pre-rendered content items without the localization-specific syntax can then be translated by human or machine translators. A translated content item having the original localization-related syntax can then be generated from the translated pre-rendered content items that do not have the localization-specific syntax. Through an implementation of the disclosed technologies, higher quality translations can be produced by both human and machine translators.

The following detailed description is also directed to technologies for scoring source content as to its suitability for localization prior to machine or human translation. In particular, when a request to translate a content item is received, a source content localizability score ("SCLS") can be computed for the content item. The SCLS indicates the suitability of the content item for translation into a specified target language. The SCLS can be computed based upon comparisons between the content item and a terminology database and a translation memory.

Human or machine translation of the content item can be performed if the SCLS exceeds a pre-defined threshold. If the SCLS does not exceed the pre-defined threshold, a source content localizability report can be generated that provides suggestions to the content creator as to how the content item can be modified to improve its SCLS. By scoring a content item as to its suitability for translation into a target language prior to performing the translation, translations of content items that are unsuitable for translation can be avoided, thereby saving processor cycles that would be utilized in performing machine translation of the content item.

The following detailed description is also directed to technologies for semantic and NLP for content categorization and routing. In particular, data can be obtained from multiple data authorities, such as CMSs. The data can then be categorized utilizing semantic processing, natural language processing ("NLP") or other techniques. Based upon the categorization, the data can be routed to various types of processing agents, such as a TMS, neural networks, sentiment mining processes, NLP, and others. Data produced by the processing agents can be exposed to various types of rendering platforms. In this manner, linguistic data maintained by the various processing agents can be consolidated and accessed from a single location, thereby improving the efficiency of access to the data and reducing network bandwidth consumption.

The following detailed description is also directed to technologies for continuous translation refinement with automated delivery of re-translated content. In particular, a TMS can receive a request to translate a content item. The translation request can include a request that the CMS submitting the content item for translation be notified if a better translation of the item becomes available. In response thereto, the TMS can initiate human or machine translation of the content item and return the translated content item to the CMS.

The TMS can also continuously determine if the translation process has been modified in way that might result in a better translation of the content item. If so, the TMS can retranslate the content item. If the retranslation of the content item is of a higher quality than the original translation, the TMS can provide an update notification to the CMS with the new translation of the content item or instructing the CMS to retrieve the new translation of the content item.

The CMS can also supply correction notifications to the TMS that include edits to a translated content item for use by the TMS in improving future translations of that content item. These mechanisms can reduce the computational resources utilized when a CMS continually polls a TMS for an updated translation, and also reduce the amount of time required for content creators to obtain higher quality translations of their content items. Additional details regarding the various mechanisms described briefly above will be provided below with regard to FIGS. 1-13.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can also be practiced in distributed computing environments, such as a distributed computing network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

I. Leveraging Content Dimensions During the Translation of Human-Readable Languages FIG. 1 is a computing system architecture diagram showing aspects of a computing system configured to provide functionality for leveraging content dimensions during the translation of human readable languages, according to one particular configuration. As illustrated in FIG. 1, a content management system ("CMS") 102 is provided in one configuration disclosed herein. The CMS 102 is a computing system that provides functionality for the creation, modification, and management of digital content. The CMS 102 can support multiple users working in a collaborative environment.

As will be described in greater detail herein, the CMS 102 provides functionality for allowing a user to specify content dimensions 114 for content items 110 managed by the CMS 102. The content items 110 can be text strings expressed in a human readable language or other types of content such as, but not limited to, images and video.

The content dimensions 114 associated with the content items 110 include metadata that is utilized to determine how to translate a content item for a particular type of use or locale. As described in greater detail below, the content dimensions 114 can be used as context at translation time that will inform the translation process and change the translation of a content item 110. The content dimensions 114 can be specified using the JavaScript Object Notation ("JSON") language, the Extensible Markup Language ("XML"), or another language suitable for defining metadata that is associated with the content items 110.

For example, and without limitation, a content dimension 114 can be specified for a particular content item 110 that specifies that the content item 110 will be utilized in a particular geographic location. As another example, a content dimension 114 can be specified for a particular content item 110 that specifies that the content item 110 is to be utilized on a particular type of computing platform, such as a mobile computing platform or a desktop computing platform.

As yet another example, a content dimension 114 can be specified for a particular content item 110 that specifies that the content item 110 is expressed in a particular style, such as in a formal or informal tone. The content items 110 can have multiple content dimensions 114, such as "mobile computing platform" and "informal tone," for example. Other examples of content dimensions 114 include, but are not limited to, content dimensions 114 that define a quality of a translation of a content item 110 or a pluralization of the translation of the content item 110.

As shown in FIG. 1, the CMS 102 can also provide a user interface ("UI") that includes UI controls through which users of the CMS 102 can specify content dimensions 114 for a particular content item 110. In the example shown in FIG. 1, for instance, a user has utilize the UI 112 to specify the content dimensions 114A for the content item 110. Other users of the CMS 102 can also specify content dimensions 114A for the content item 110 using the UI 112. The CMS 102 can store the content dimensions 114A in association with the content item 110 in an appropriate data store, such as the content data store 108 illustrated in FIG. 1. Although a single CMS 102 is illustrated in FIG. 1, multiple CMS 102 can be utilized in other configurations.

As also shown in FIG. 1, the CMS 102 can operate in conjunction with a translation management system ("TMS") 104. The TMS 104 is a computing system that provides functionality for managing translations of human readable text. The TMS 104 can provide functionality including, but not limited to, automating the translation process, facilitating communication between translators, and receiving content items 110 from the CMS 102 and assigning the content items 110 to translators for translation.

The TMS 104 can also maintain a "translation memory" (not shown in FIG. 1), which is a database of previously translated phrases and fragments, commonly referred as a translation memory, and terminology databases that hold translations of terms and branding. The TMS 104 can also provide functionality for performing machine translations of the content items 110. For example, and without limitation, the TMS 104 can utilize the machine translation pipeline, and other related technologies, described in U.S. patent application Ser. No. 14/867,932, which was filed on Sep. 28, 2015, and entitled "Optimized Statistical Machine Learning System with Rapid Adaptation Capability", and which is expressly incorporated by reference herein in its entirety. Other machine translation technologies can be utilized in other configurations. Alternately, the TMS 104 can integrate with external systems (not shown in FIG. 1 for performing machine translations of the content items 110.

As illustrated in FIG. 1, the CMS 102 can provide requests to the TMS 104 to translate content items 110. In the example shown in FIG. 1, for instance, the CMS 102 has provided a translation request 116 to the TMS 104. The translation request 116 includes or references the content item 110 to be translated. The translation request 116 also includes or references the content dimensions 114A associated with the content item 110. The translation request 116 can include other information such as, but not limited to, information identifying the source and target languages for the content item 110 and other metadata associated with the content item 110.

The TMS 104 receives the translation request 116 and manages or performs the translation of the content item 110 from a source human readable language to a target human readable language. Translation of the content item 110 can by a human translator, by machine translation, by a combination (machine translation with post-editing by human translators), and may leverage linguistic technologies such as the terminology databases and translation memory described above.

As described more fully herein, the TMS 104 can leverage the content dimensions 114A associated with the content item 110 throughout the machine or human language translation process. For example, and without limitation, the content dimensions 114A can be used as context which will inform the translation of the content item 110, allowing the human or machine translators to provide a higher quality translation of the content item 110. In addition, the human or machine translator can provide translations for content dimensions 114A that do not exist in the source content item 110.

For example, and without limitation, the content item 110 might include the text "Go" and the content dimensions 114A associated with the content item might specify a platform (e.g. "desktop") and a language (e.g. English). Since "Go" is a short string and is therefore suitable for display on a small screen such as that of a mobile computing device, no English, mobile version of the string will be created. Both desktop and mobile devices will see "Go" when the content item 110 is viewed in English.

During translation of the content item 110 into German, however, a human translator will see the source text "Go" and be prompted to translate into the content dimensions 114A for "desktop" and "mobile." In response thereto, the translator could create "Fertigstellen" for the content dimensions 114A of German and desktop, and "Los" for the content dimensions 114A of German and mobile. In this manner, content owners can utilize the content dimensions 114A to localize their content items 110 more effectively with fewer iterations between translators, engineers, and user experience ("UX") designers.

As shown in FIG. 1, the TMS 104 can also include a UI 118 that includes UI controls that allow human translators to add additional content dimensions 114B for the content item 110. The UI 118 can also provide functionality for allowing users to modify or delete existing content dimensions 114B. A machine translation component can also add additional content dimensions 114B for the content item 110 in a similar fashion. The additional content dimensions 114B for the content item 110 can be returned to the CMS 102 and associated with the content item 110 in the content data store 108.

As also shown in FIG. 1, the TMS 104 can return a response 120 to the translation request 116 sent by the CMS 102 that includes the translated content item 122 and the associated content dimensions 114B. In turn, the CMS 102 can store the translated content item 122 and the associated content dimensions 114B in the content data store 108.

The CMS 102 can also provide functionality for receiving and responding to requests from content consumers, such as the content consumer 106, for content items 110 stored in the content data store 108. The content consumer 106 can be any type of program or service that utilizes the content items 110 such as, but not limited to, a rendering platform like a Web server that is configured to generate Web pages or other types of pages utilizing the content items 110.

In the example shown in FIG. 1, for instance, the content consumer 106 has transmitted a content request 124 to the CMS 102 for the translated content item 122. In response thereto, the CMS 102 has transmitted a response 126 to the content consumer 106 that includes the translated content item 122. The response 126 also includes the content dimensions 114B associated with the translated content item 122. The content consumer 106 can utilize the content dimensions 114B for the translated content item 122 in its processing of the translated content item 122.

For example, and without limitation, the content consumer 106 might render the translated content item 122 differently depending upon the associated content dimensions 114B. In some configurations, the content consumer 106 can also update or supply new content dimensions 114B for the translated content item 122. The new or updated content dimensions 114B can be provided to the CMS 102 and associated with the translated content item 122 in the content data store 108.

In some configurations, the CMS 102 also provides functionality for specifying a fallback between content dimensions. For example, and without limitation, the content dimension 114 "desktop" can be specified as the default computing platform. If no content exists for a particular content item 110 for the "mobile" content dimension 114, then the CMS 102 will return the content item 110 having the "desktop" content dimension. This fallback mechanism is used by the CMS 102 at runtime when fetching content items 110 to provide to the content consumer 106. Multiple levels of fallback can be provided in a similar manner. Additional details regarding the fallback mechanism will be provided below with regard to FIG. 2B. Additional details regarding the operation of the CMS 102 and the TMS 104 will be provided below with regard to FIG. 2A.

Figure 2A:
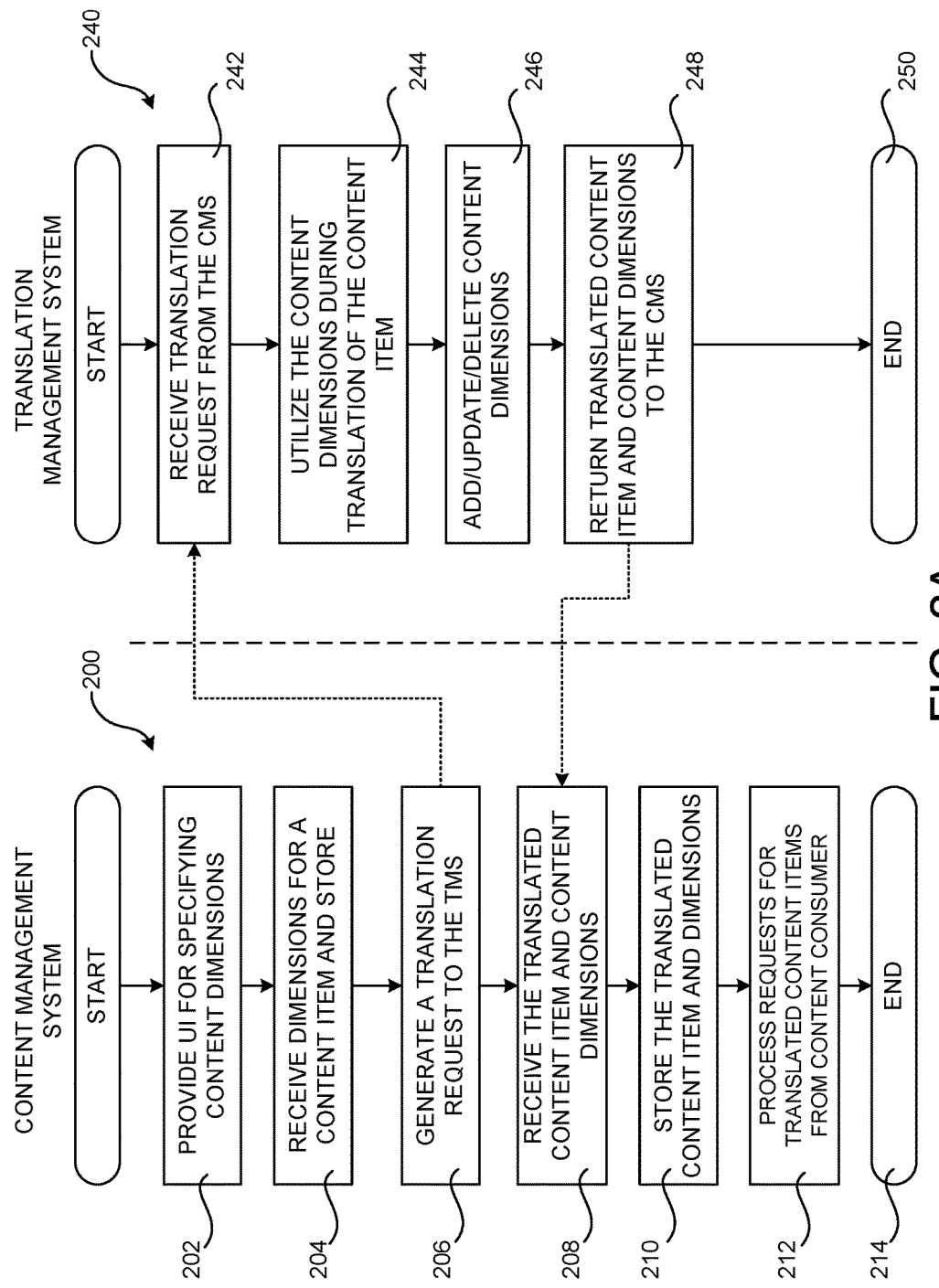
FIGS. 2A and 2B are flow diagrams showing several routines that together illustrate additional aspects of the operation of the computing system shown in FIG. 1 for leveraging content dimensions during language translation of content items, according to one particular configuration.
Figure 2B:
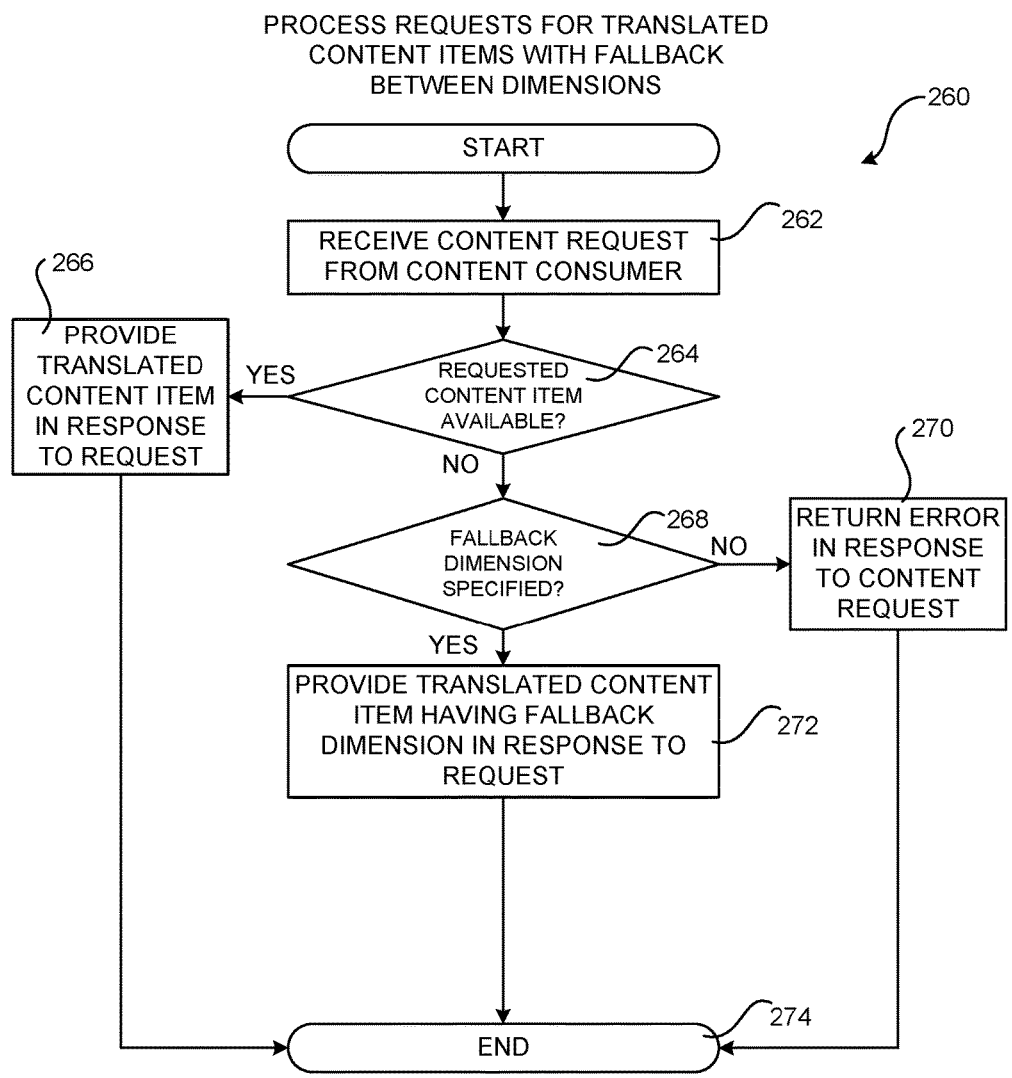

FIGS. 2A and 2B are flow diagrams showing routines 200, 240, and 260 that illustrate additional aspects of the operation of the computing system shown in FIG. 1 for leveraging content dimensions 114 during language translation of content items 110, according to one particular configuration. It should be appreciated that the logical operations described herein with respect to FIGS. 2A and 2B, and the other FIGS., can be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special-purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 200 begins at operation 202, where the CMS 102 provides the UI 112 for specifying content dimensions 114 for content items 110. The routine 200 then proceeds to operation 204, where the CMS 102 receives content dimensions 114 for a content item 110 and stores the content dimensions 114 in association with the content item 110 in the content data store 108. In this regard, it is to be appreciated that certain users can define the content dimensions 114 (e.g. at operation 202) for a content item 110 while other users specify values for the content dimensions 114 (e.g. at operation 204).

From operation 204, the routine 200 proceeds to operation 206, where the CMS 102 transmits a translation request 116 to the TMS 104. As discussed above, the translation request 116 can include a content item 110 to be translated, its associated content dimensions 114, and potentially other information.

The TMS 104 receives the translation request 116 from the CMS 102 at operation 242 of the routine 240. The routine 240 then proceeds from operation 242 to operation 244, where the TMS 104 utilizes the content dimensions 114 during the translation of the content item 110 specified by the translation request 116. From operation 244, the routine 240 proceeds to operation 246, where the TMS 104 can add, update, or delete content dimensions 114 associated with the content item 110. The TMS 104 can also add content dimensions 114 to the translated content item 122. As discussed above, the content dimensions 110 can be added, updated, and deleted by a human translator through the UI 118 or by a machine translation service.

From operation 246, the routine 240 proceeds to operation 248, where the TMS 104 returns a response 120 to the request 116 that includes the translated content item 122 and the content dimensions 114B. The routine 240 then proceeds from operation 248 to operation 250, where it ends.

The CMS 102 receives the response 120 from the TMS 104 at operation 208 of the routine 200. The routine 200 then proceeds from operation 208 to operation 210, where the CMS 102 stores the translated content item 122 and its associated content dimensions 114B in the content data store 108. Thereafter, the routine 200 proceeds from operation 210 to operation 212, where the CMS 102 can receive and respond to content requests 124 from content consumers 106 in the manner described above. The routine 200 then proceeds from operation 212 to operation 214, where it ends.

The routine 260 illustrates aspects of the operation of the CMS 102 for providing fallback between content dimensions 114. The routine 260 begins at operation 262, where the CMS 102 receives a content request 124 from a content consumer 106, such as a rendering platform. The content request 124 can specify a particular content item 110 having a certain content dimension 114. For example, and without limitation, the content request 124 might be for a content item 110 having the content dimension for language of Japanese.

In response to receiving the content request 124, the routine 260 proceeds from operation 262 to operation 264 where the CMS 102 determines whether the requested content item 264 with the specified content dimension 114 is present in the content data store 108. If the requested content item 264 with the specified content dimension 114 is present in the content data store 108, the routine 260 proceeds to operation 266, where the requested content item 110 is retrieved from the content data store 108 and returned, along with its associated content dimensions 114, in a response 126 to the request 124. The routine 260 then proceeds from operation 266 to operation 274, where it ends.

If, at operation 264, the CMS 102 determines that the requested content item 110 with specified content dimension 114 is not in the content data store 108, the routine 260 proceeds from operation 264 to operation 268. At operation 268, the CMS 102 determines whether a fallback content dimension has been specified for the requested content item 110. If a fallback content dimension has not been specified for the requested content item, the routine 260 proceeds from operation 268 to operation 270, where an error message can be returned in response to the content request 124.

If, however, at operation 268, the CMS 102 determines that a fallback content dimension has been specified for the requested content item 110, the routine 260 proceeds to operation 272. At operation 272, the CMS 102 provides the content item 110 having the fallback content dimension in a response 126 to the content request 124. For instance, if a content item 110 having the content dimension for language of Japanese has been requested but is not available, the CMS 102 might return a content item 110 having the content dimension of English. In this manner, English language content items 110 can be provided when the corresponding Japanese content items 110 are not available. The response 126 can also specify the dimensions that were utilized as fallback dimensions in some configurations. From operation 272, the routine 260 proceeds to operation 274, where it ends.

II. Abstraction of Syntax in Localization Through Pre-Rendering

When developing software, a software developer can rely on special localization-related syntax, such as (e.g. International Component for Unicode ("ICU") message pattern strings), to create dynamic content items (e.g. text strings). For example, a string containing such localization-related syntax could be: "You have {0} items in your cart". When rendered at runtime, the variable-element placeholder (i.e. the value between the curly brackets in the example shown above) is replaced with a real value and can then be displayed (e.g. such as to an end customer) or otherwise utilized.

Some types of localization-related syntax, like ICU, can be also used to represent complex dynamic strings. For example, ICU message pattern strings can be utilized to represent different variants of a string based on the value of a placeholder. This can be very useful, for example, to represent different plural language forms. For example, an ICU string could be: "{0,plural,=0 {There were no errors in the last hour.} one {There was one error in the last hour.} other {There were {0,number,integer} errors in the last hour.}}". This is useful, as in some languages the plural rules can be more complicated than in the English language.

When such a string is sent for human translation, the human translators usually work around the localization-related syntax. While this is relatively straightforward with simple placeholders, when dealing with more complex syntax such as ICU message pattern strings, this can be a very error prone process. Similarly, errors can occur when strings containing complex localization-related syntax are machine translated. The technologies disclosed herein address these and potentially other problems by removing localization-specific syntax from content items 110 (e.g. text strings) in order for machine and human translators to focus entirely on translation and not on the original localization-specific string syntax. Additional details regarding this process are provided below with regard to FIGS. 3 and 4.

Figure 3:
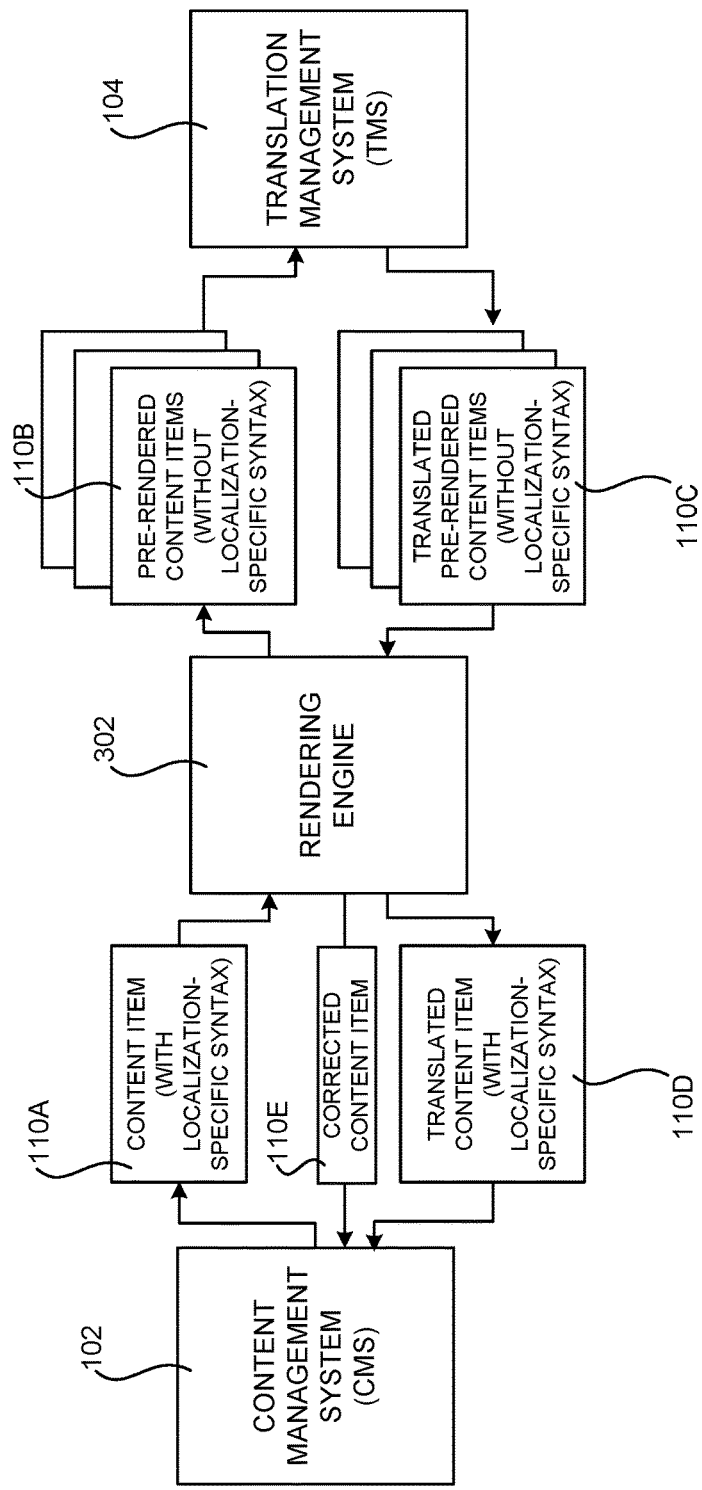
FIG. 3 is a computing system architecture diagram showing aspects of a computing system configured to provide functionality for pre-rendering content items to remove localization-related syntax prior to machine or human translation, according to one particular configuration.

FIG. 3 is a computing system architecture diagram showing aspects of a computing system configured to provide functionality for pre-rendering content items 110 to remove localization-related syntax prior to machine or human translation, according to one particular configuration. As shown in FIG. 3, the CMS 102 can maintain a content item 110A that has localization-specific syntax, such as variable-element placeholders. The variable-element placeholders can represent plural language forms or other types of content. In one configuration, the localization-specific syntax is expressed using the ICU MessageFormat syntax. It is to be appreciated, however, that localization-specific syntax can be represented in other ways in other configurations. Strings such as these can be difficult for human translators to parse and, typically, cannot be machine translated.

As also shown in FIG. 3, the CMS 102 can provide the content item 110A having localization-specific syntax to a rendering engine 302. The rendering engine 302 is a software component configured to pre-render the content item 110A to remove the localization-specific syntax. The rendering engine 302 will use the source language, target language and localization-specific syntax in the content item 110A to generate pre-rendered content items 110B (e.g. text strings) that do not contain localization-specific syntax.

In simple use cases, the rendering engine 302 can simply replace a placeholder in the content item 110A with a value. But, in more complex use cases, such as plural rules, the rendering engine needs to actually generate content. In Russian, for example, there are four different plural language forms. Accordingly, the example string: "{0,plural,=0 {There were no errors in the last hour.} one {There was one error in the last hour.} other {There were {0,number,integer} errors in the last hour.}}" will be rendered as: "There were 0 errors in the last hour" (where n=0); "There was 1 error in the last hour" (where n ends with the number 1, such as 1, 21, 31, etc.); "There were 2 errors in the last hour" (where n ends with the number 2 or 3 or 4, such as 2, 22, 32, 3, 23, 33, etc); and "There were 5 errors in the last hour" (other cases).

Once the rendering engine 302 has generated the pre-rendered content items 110B that do not contain localization-specific syntax, these content items 110B can be provided to the TMS 104 for translation. Because the pre-rendered content items 110B do not contain localization-specific syntax, a standard translation tool (i.e. one not configured for presenting location-specific syntax) that presents a simplified UI (i.e. one that does not present location-specific syntax) can be used by a human translator, and simplified content can be provided to a machine translation system. In this manner, the human translator can focus on translating the actual content items 110B without having to handle the complex localization-specific syntax. Additionally, these strings can be translated using machine translation, which is typically not possible using strings containing localization-specific syntax. The TMS 104 generates translated pre-rendered content items 110C in the target language that also do not contain localization-specific syntax 110C. The TMS 104 provides the translated pre-rendered content items 110C back to the rendering engine 302.

The rendering engine 302, in turn, recreates the original localization-specific syntax (i.e. the localization-specific syntax contained in the original content item 110A) based on the translated pre-rendered content items 110C. For example, in the example Russian use case described above, the rendering engine 302 will use the five possible variants of the content item 110A and create a valid string containing localization-specific syntax, such as: "{0,plural,=0 {russian content} one {russian content} few {russian content} other {russian content}}". The rendering engine 302 then returns the translated content item 110D having localization-specific syntax 110D to the CMS 102 for storage.

As discussed briefly above, the mechanism described with regard to FIG. 3 provides a meaningful technical benefit by allowing human and machine translators to focus only on the translation of the content item 110A without regard to any localization-specific syntax contained therein. This can provide better human translations, enable machine translations that were previously not possible, and reduce processor and memory utilization in some configurations. Additional details regarding this mechanism are provided below with regard to FIG. 4.

In one configuration, the rendering engine 302 can also provide functionality for validating content items, like the content item 110A. For example, and without limitation, the rendering engine 302 can provide functionality for determining whether a content item 110A includes all of the plural language formats available for a certain language. If a content item 110A does not include all of the plural language formats, the rendering engine 302 can correct the content item 110A to include the missing plural language format. A corrected content item 110E can then be provided back to the CMS 102 or pre-rendered in the manner described above. The rendering engine 302 can perform other types of content validation in other configurations.

Figure 4:
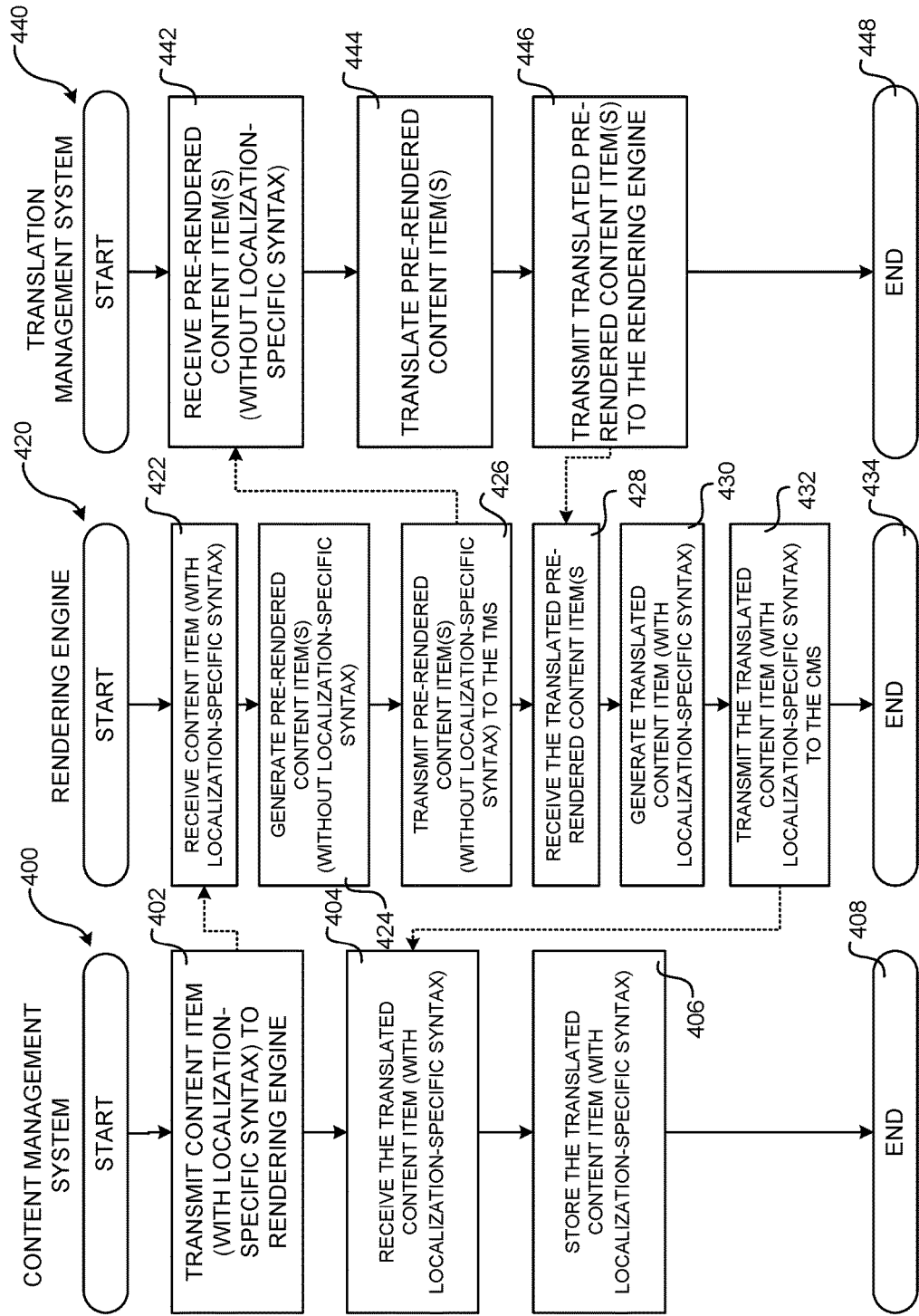
FIG. 4 is a flow diagram showing several routines that together illustrate additional aspects of the operation of the computing system shown in FIG. 3 for pre-rendering content items to remove localization-related syntax prior to machine or human translation, according to one particular configuration.

FIG. 4 is a flow diagram showing several routines 400, 420, and 440 that together illustrate additional aspects of the operation of the computing system shown in FIG. 3 for pre-rendering content items 110 to remove localization-related syntax prior to machine or human translation, according to one particular configuration. The routines 400, 420, and 440 are described together in detail below.

The routine 400 begins at operation 402, where the CMS 102 transmits a content item 110A, or items, that contains localization-specific syntax to the rendering engine 302. The rendering engine 302 receives the content item 110A at operation 422 of the routine 420. The routine 420 then proceeds from operation 422 to operation 424, where the rendering engine 302 pre-renders the content item 110A to generate the pre-rendered content items 110B that do not contain localization-specific syntax.

From operation 424, the routine 420 proceeds to operation 426, where the rendering engine 302 transmits the pre-rendered content items 110B that do not contain localization-specific syntax to the TMS 104. The TMS 104 receives the pre-rendered content items 110B at operation 442 of the routine 440. The routine 440 then proceeds from operation 442 to operation 444, where a human translator or a machine translation system translates the pre-rendered content items 110B to generate the translated pre-rendered content items 110C. As discussed above, the translated pre-rendered content items 110C do not contain localization-specific syntax. The TMS 104 transmits the translated pre-rendered content items 110C to the rendering engine 302 at operation 446. From operation 446, the routine 440 proceeds to operation 448, where it ends.

The rendering engine 302 receives the translated pre-rendered content items 110C at operation 428 of the routine 420. The routine 420 then proceeds to operation 430, where the rendering engine 302 generates the translated content item 110D containing the original localization-specific syntax. The rendering engine 302 transmits the translated content items 110D containing the localization-specific syntax to the CMS 102 at operation 432. The routine 420 then proceeds to operation 434, where it ends.

The CMS 102 receives the translated content item 110D at operation 404 of the routine 400. The routine 400 then proceeds from operation 404 to operation 406, where the CMS 102 stores the translated content item 110D containing localization-specific syntax for use in responding to requests, such as from the content consumer 106, or for use in other ways. The routine 400 then proceeds from operation 406 to operation 408, where it ends.

III. Source Language Content Scoring for Localizability

Figure 5:
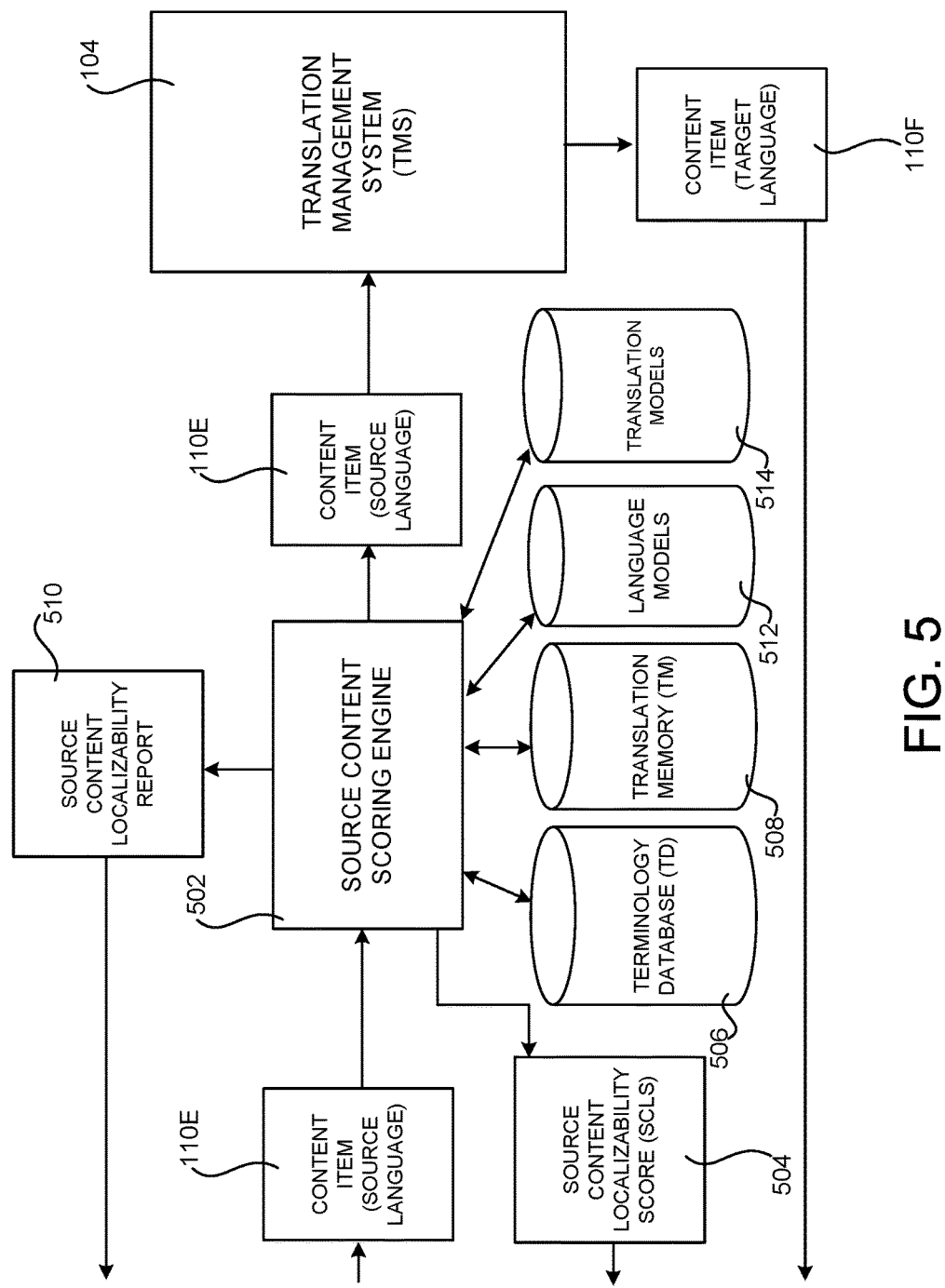
FIG. 5 is a computing system architecture diagram showing aspects of a computing system configured to perform scoring of source content as to its suitability for localization prior to machine or human translation, according to one particular configuration.

FIG. 5 is a computing system architecture diagram showing aspects of a computing system configured to perform scoring of source content as to its suitability for localization prior to machine or human translation, according to one particular configuration. As illustrated in FIG. 5, a source content scoring engine 502 is provided in one configuration. The source content scoring engine 502 can execute as a part of the CMS 102, as a part of the TMS 104, or separately from the CMS 102 and the TMS 104. As will be discussed in greater detail below, the source content scoring engine 502 is configured to generate a score indicating the suitability of a particular content item 110E for translation into a target language. This score is referred to herein as the score content localizability score ("SCLS") 504.

The SCLS 504 can be generated for a content item 110 in response to receiving a request to perform human or machine translation of the content item 110. In some configurations, the source content scoring engine 502 (or another service) can expose a network services application programming interface ("API") for receiving requests to compute a SCLS 504 for a content item 110 before a request is submitted to translate the content item 110. The SCLS 504 for a particular content item 110 can also be generated in response to the occurrence of other types of events in other configurations.

In the example shown in FIG. 5, a content item 110E has been submitted to the source content scoring engine 502 for computation of the SCLS 504. In one particular configuration, the SCLS 504 is based, at least in part, upon a comparison of the content item 110E and the contents of a terminology database ("TD") 506. The TD 506 is a centralized compilation of company, industry-specific and/or technical terms. The TD 506 can include source language terms and approved target language translations for the source language terms. The TD 506 can also include terms or phrases that are not to be translated, but are to be kept in their source language.

During the comparison of the content item 110E to the contents of the TD 506, a determination can be made as to whether the content item 110E utilizes terminology in a manner that is consistent with the contents of the TD 506. An inconsistent use of terminology in the content item 110E as compared to the TD 506 will lower the SCLS 504. Consistent use of terminology in the content item 110E as compared to the TD 506 will increase the SCLS 504.

The SCLS 504 can also be based, at least in part, upon a comparison of the content item 110E and the contents of a translation memory ("TM") 508. The TM 508 includes source and target text for content previously translated by the TMS 104. A comparison of the content item 110E to the contents of the TM 508 can indicate where content is contained in the content item 110E that has been previously translated by the TMS 104. Content contained in both the content item 110E and the TM 508 will increase the SCLS 504. If the content item 110E does not contain content in the TM 508, the SCLS 504 will be lowered.

The SCLS 504 can also be computed based, at least in part, upon one or more language models 512. A language model 512 is a probability distribution over a sequence of words. The SCLS 504 can also be computed based, at least in part, upon one or more translation models 514. A translation model 514 is a statistical model whose parameters are derived from an analysis of bilingual text corpora.

In some configurations, the source content scoring engine 502 can also use rules (not shown in FIG. 5) and/or machine learning to score the content item 110E as to its suitability for translation into the target language. For example, and without limitation, the rules can identify attributes of the source language content item 110E that, if present, will increase or decrease the SCLS 504. For example, a rule might state: "If the target language is French and the content item contains a semicolon, then decrease the SCLS 504." In this manner, various attributes of the content item 110E can be utilized to increase or decrease the SCLS 504. Other mechanisms can also be utilized to increase or decrease the SCLS 504 in other configurations.

Once the source content scoring engine 502 has computed the SCLS 504, a determination can be made based upon the SCLS 504 as to whether the content item 110E is to be translated into the target language. For example, and without limitation, the SCLS 504 can be compared to a pre-defined threshold value to determine if the content item 110E is to be translated into the target language. If the SCLS 504 exceeds the pre-defined threshold, the content item 110E can be provided to the TMS 104 for human or machine translation of the content item 110E. The translated content item 110F in the target language can then be provided back to the requestor of the translation.

If, however, the SCLS 504 does not exceed the pre-defined threshold, the source content scoring engine 502 (or another component) can prevent the TMS 104 from translating the content item 110E to the target language. In this manner, source content that is not sufficiently suitable for translation to the target language will not be translated by the TMS 104, thereby saving processing capacity, power, memory, and other computational resources.

In some configurations, the source content scoring engine 502 is also configured to generate a source content localizability report 510 (which might be referred to as the "report" 510) for the content item 110E. The report 510 includes data identifying suggestions as to how the content item 110E can be modified in order to improve its SCLS 504. For example, and without limitation, the report 510 might suggest that certain types of characters (e.g. colons) contained in the content item 110 that are not suitable for translation be removed. The report might also suggest that plural language forms or other types of language constructs that make translation more difficult be removed from the content item 110E. Other types of suggestions for improving the SCLS 504 for the content item 110E can also be made in the report 510. The report 510 can be provided to the requestor of the translation via a suitable UI or returned as a response to a network services API call for the SCLS 504 for a content item 110E. Additional details regarding the operation of the source content scoring engine 502 will be provided below with regard to FIG. 6.

In one configuration, source content (e.g. the content item 110E) can be provided to the source content scoring engine 502 as the content is being authored. For example, the source content can be provided to the source content scoring engine 502 as it is being typed or edited by a user. The SCLS 504 for the content can then be computed in real or near-real time and presented to the user in an appropriate UI. Additionally, changes to the source content to improve the SCLS 504 can also be identified and presented to the user in real or near-real time. In this manner, a user can utilize the SCLS 504 to improve the quality of their content as the content is being created or edited in real or near-real time.

Figure 6:
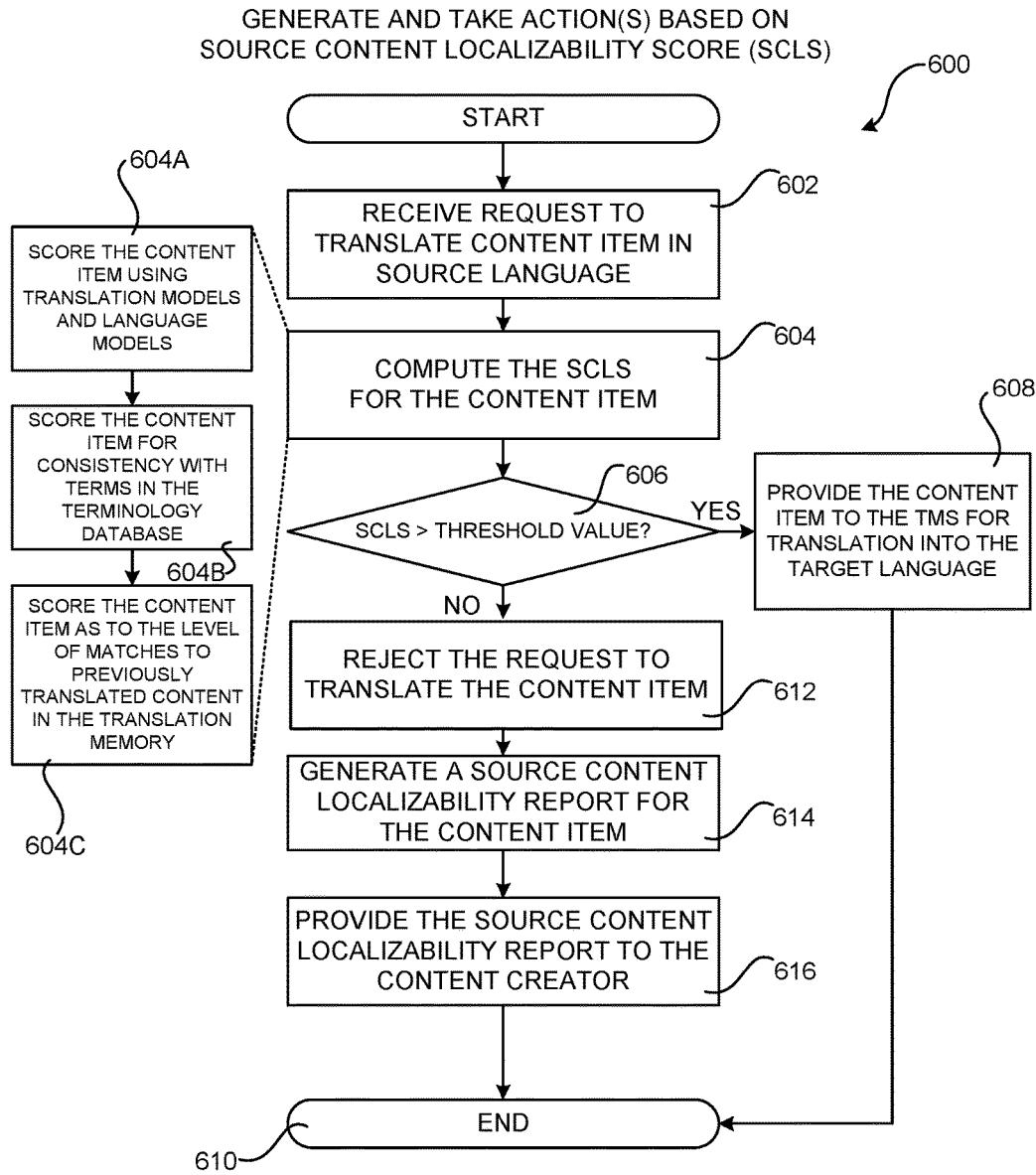
FIG. 6 is a flow diagram showing a routine that illustrates additional aspects of the operation of the computing system shown in FIG. 5 for performing source content scoring for localizability prior to machine or human translation, according to one particular configuration.

FIG. 6 is a flow diagram a routine 600 that illustrates additional aspects of the operation of the computing system shown in FIG. 5 for performing source content scoring for localizability prior to machine or human translation, according to one particular configuration. The routine 600 begins at operation 602, where the source content scoring engine 502 (or another component) receives a request to translate a content item 110E in a source language to a target language. As discussed above, the source content scoring engine 502 can also expose an API through which a SCLS 504 and a source content localizability report 510 can be requested in some configurations.

In response to receiving a request to translate the content item 110E, the routine 600 proceeds to operation 604, where the source content scoring engine 502 computes the SCLS 504 for the content item 110E. For example, and without limitation, at operation 604A, the source content scoring engine 502 might utilize the language models 512 and/or the translation models 514 to score the content item 110E as to its suitability for translation into the specified target language. At operation 604B, the source content scoring engine 502 can score the content item 110E based upon a comparison to the contents of the TD 506. At operation 604C, the source content scoring engine 502 can score the content item 110E as to the level of matches with previously translated content contained in the TM 508. Other techniques can also be utilized to generate the SCLS 504 in other configurations.

From operation 604, the routine 600 proceeds to operation 606, where the source content scoring engine 502 can compare the SCLS 504 to a pre-defined threshold value. If the SCLS 504 exceeds the pre-defined threshold value, the routine 600 proceeds from operation 606 to operation 608. At operation 608, the content item 110E is provided to the TMS 104 for human or machine translation into the specified target language. The routine 600 then proceeds from operation 608 back to operation 610, where it ends.

If, at operation 606, it is determine that the SCLS 504 does not exceed the pre-defined threshold value, the routine 600 proceeds from operation 606 to operation 612. At operation 612, the request to translate the content item 110E to the target language is rejected. The routine 600 then proceeds from operation 612 to operation 614, where the source content scoring engine 502 generates a source content localizability report 510 for the content item 110E.

As discussed above, the report 510 can include data that identifies suggestions for modifying the content item 110E in order to improve its SCLS 504. From operation 614, the routine 600 proceeds to operation 616, where the report 510 can be provided to the requestor of the translation of the content item 110E (e.g. the creator of the content item 110E). From operation 616, the routine 600 proceeds to operation 610, where it ends.

IV. Semantic and NLP for Content Categorization and Routing

Figure 7:
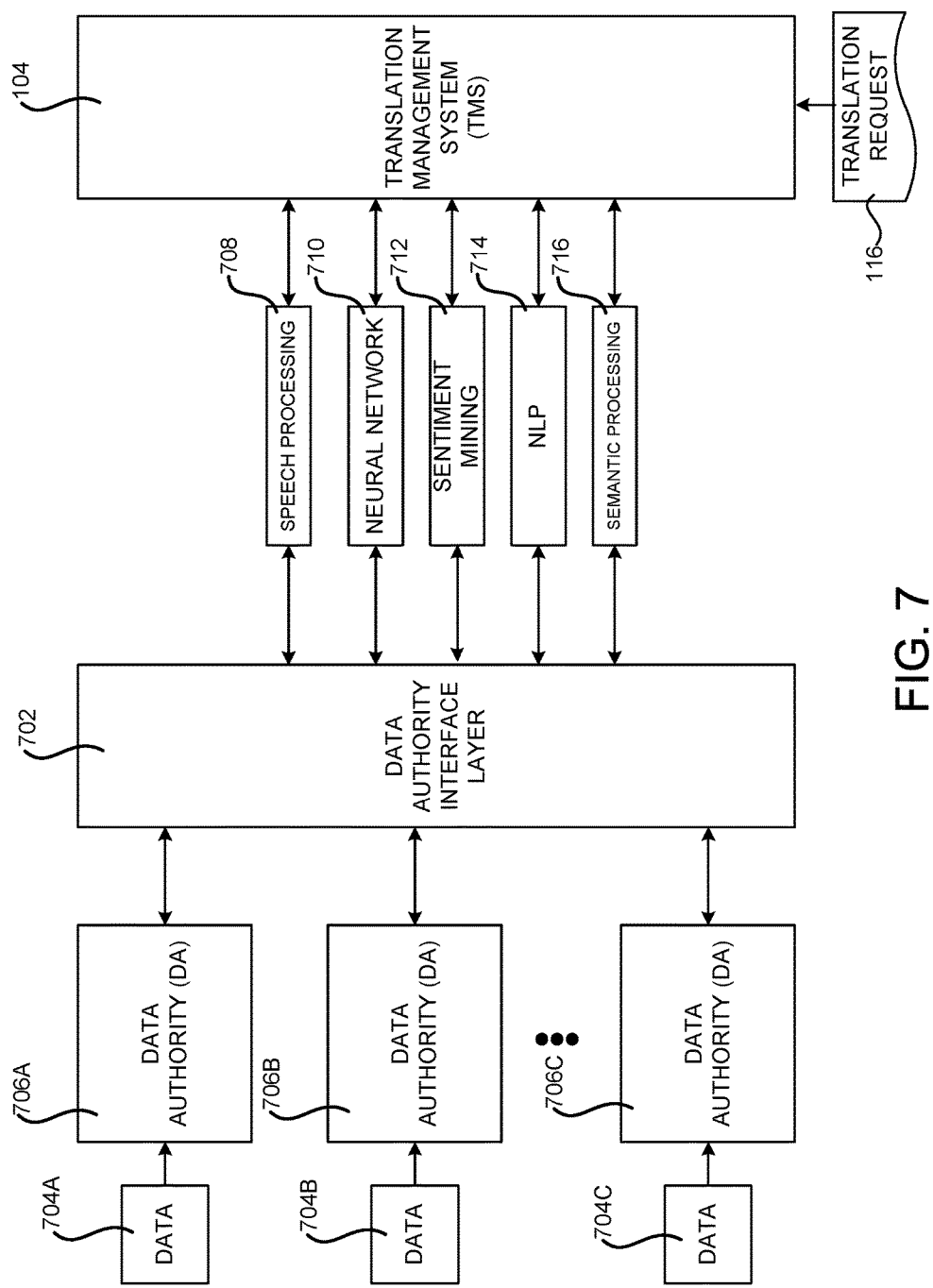
FIG. 7 is a computing system architecture diagram showing aspects of a computing system configured to perform semantic and natural language processing ("NLP") for content categorization and routing, according to one particular configuration.

FIG. 7 is a computing system architecture diagram showing aspects of a computing system configured to perform semantic and NLP for content categorization and routing, according to one particular configuration. As shown in FIG. 7, a data authority interface layer 702 is provided in one configuration. The data authority interface layer 702 is configured to provide functionality for content categorization, routing, and rendering.

In particular, the data authority interface layer 702 can obtain data 704A-704C from one or more data authorities 706A-706C, respectively. The data 704 can include content items 110, such as those described above, and/or other types of content. For example, and without limitation, the data 704 can be generated from search queries, speech-to-text and text-to-speech processing, observing user interaction with a computing system, machine translation, and/or in other ways. The data authorities 706 can be content management systems, such as the CMS 102 described above, databases, data warehouses, or other types of data repositories.

The data authority interface layer 702 can also provide functionality for routing the data 704 to various processing agents. For example, and without limitation, the data authority interface layer 702 can route the data 704 to processing agents configured to provide speech processing 708, sentiment mining 712, natural language processing 714, semantic processing 716, neural networks 710, and/or other types of processing.

The processing agents, in turn, can provide functionality for categorizing the data 704 and/or performing other types of processing on the data. Various technologies can be utilized to categorize the data such as, but not limited to, semantic processing, natural language processing, recursive neural networks, and others. The categories might indicate a source of the data 704, various attributes of the data 704, and or other aspects of the data 704. The categories can be recorded by creating metadata tags that are associated with the data 704. The metadata tags can be stored with or separately from the data 704. The processing agents can also expose the processed data to the TMS 104. Although the processing agents are shown in a parallel arrangement in FIG. 7, the processing agents can also be configured serially in other configurations.

In one particular configuration, the data 704A provided by the data authority 706A is product data, such as that maintained for products or services available for purchase through an e-commerce site. The product data can be maintained in multiple languages. For example, and without limitation, the same product (e.g. a DVD) might be available from the same e-commerce site in different versions that have been customized for foreign countries. The English-language DVD entitled "Die Hard: With a Vengeance", for example, is titled as "Die Hard: Mega Hard" in Belgium. The product data can also include product purchase history for a customer of an e-commerce site.

This type of product data can be utilized to perform named entity recognition in the system shown in FIG. 7. For example, and without limitation, if a request 116 is received at the TMS 104 to translate a content item 110 that contains the text string "Die Hard: With a Vengeance" to Dutch for presentation in a Belgian marketplace, a request can be provided to the data authority interface layer 702 for data available from the data authorities 706 regarding this text string. In this example, the data authority 706A has data 704A indicating that English-language DVD entitled "Die Hard: With a Vengeance" is titled as "Die Hard: Mega Hard" for the Belgian marketplace. This information can be returned to the TMS 104 for use in translating the string "Die Hard: With a Vengeance."

In this example, the TMS 104 would not perform a human or machine translation of the string "Die Hard: With a Vengeance" to Dutch (which could be translated incorrectly as "Die Hard: met een wraak"), but rather will utilize the string provided by the data authority 706A for the named entity (i.e. "Die Hard: Mega Hard"). This saves the TMS 104 processing time because it avoids the translation of the phrase "Die Hard: With a Vengeance"). In a similar manner, the system shown in FIG. 7 can be utilized to avoid a translation of the word "King" in the name of the famous author "Stephen King." A similar process can be utilized to perform named entity recognition for other types of entities in other configurations.

Several other scenarios in which the technologies illustrated in FIG. 7 can be utilized are described briefly below. In one configuration, for instance, the technologies shown in FIG. 7 can be utilized in the prioritization of translations. For example, and without limitation, an Italian user might send a message to a product support team about poor voice guidance for users with disabilities by a voice-controlled electronic device. Similar messages can also be received in French and Spanish. The semantic and NLP processing performed by the processing agents 716 and 714, respectively, can identify key terms of negative sentiment and, since these are accommodation issues, the translations can be prioritized to quickly address users the concerns of users with disability problems.

In another example, a product is launching a new country and, therefore, documents associated with the new product need to be translated. The target locale and high priority product mentions are programmatically identified in the documents uploaded for translation. Since the launch is at some point in the future and the content is for products that are part of the launch, the content is sent out to a vendor for translation with the highest priority. The content might even be split across multiple vendors to meet the tight timeline. Appropriate quality checks and source data are automatically provided to the vendors by one of the processing agents to achieve the highest quality.

The technologies shown in FIG. 7 can also be utilized in the identification of domain experts and best resources for translations. For example, and without limitation, a term for a recently released software product might appear in a list of uploaded files. The terms can be recognized and the content can be routed to an appropriate linguist approved to translate software documentation. In another example, product description content is sent for translation. The processing agents 714 and 716 identify the format and descriptions as common product descriptions, and the content gets routed to the appropriate domain specific machine translation engines, vendors, and post-editing teams to ensure the highest quality.

The technologies shown in FIG. 7 can be also utilized for re-driving content based on NLP. For example, and without limitation, a product team might change the name, marketing, and functional descriptions of a product before its release. In preparation for the launch, the team might have translated a lot of content prior to the name change. The content team can identify any content with the incorrect name, description and marketing across all the translations. Those translations can be updated or resent for translation to the TMS 104 automatically.

In another example, a customer survey of common seller product listing tools and button names in a specific locale has prompted a UI team to change their buttons and naming conventions. The team wants to quickly identify every string, document, and marketing translation based on the incorrect naming and replace them or re-drive the translation. The processing agents 714 and 716 can find the instances in the TMS 104 and CMS 102 and prioritize the content and re-drive the translations. Additional details regarding the configuration shown in FIG. 7 will be provided below with regard to FIG. 8.

Figure 8:
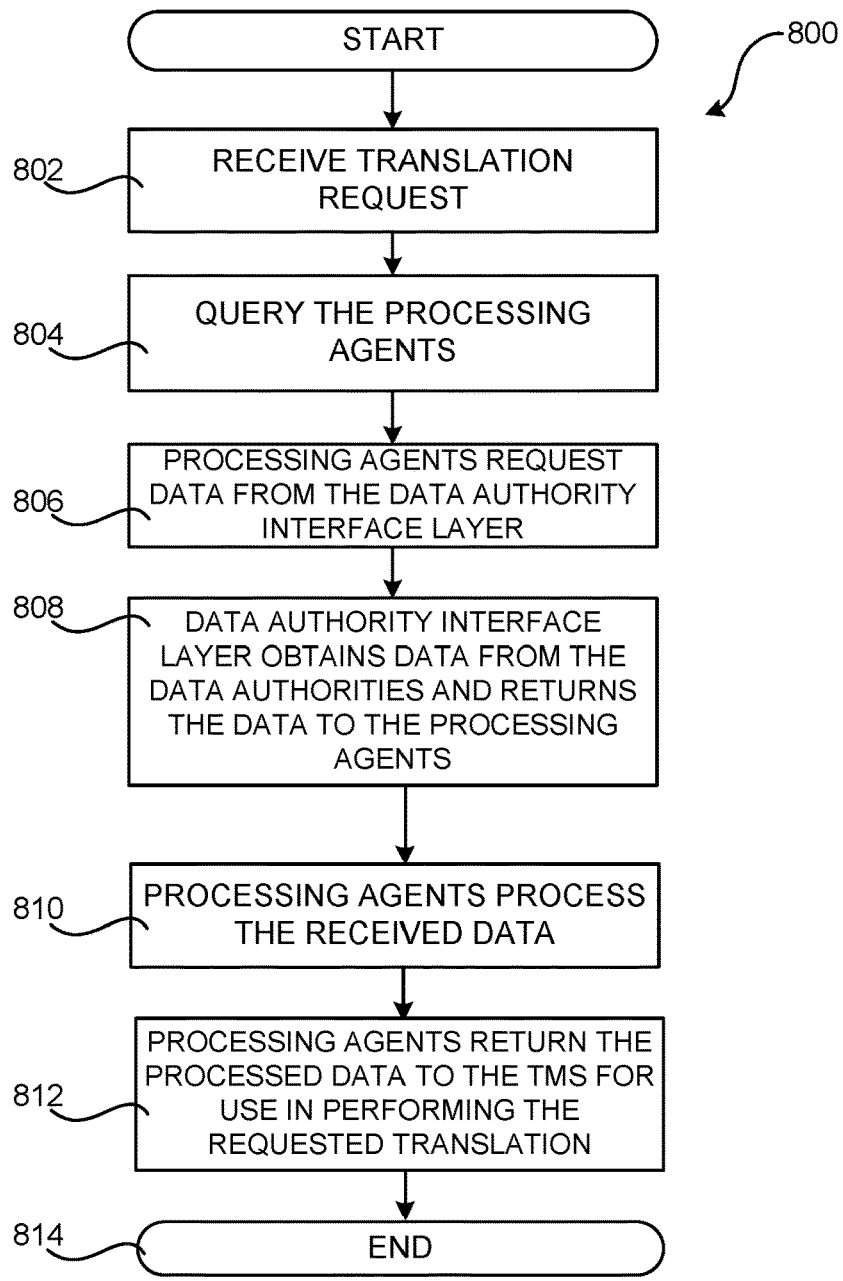
FIG. 8 is a flow diagram showing a routine that illustrates additional aspects of the operation of the computing system shown in FIG. 7 for performing semantic and NLP for content categorization and routing, according to one particular configuration.

FIG. 8 is a flow diagram showing a routine 800 that illustrates additional aspects of the operation of the computing system shown in FIG. 7 for performing content categorization and routing, according to one particular configuration. The routine 800 begins at operation 802, where the TMS 104 receives a translation request 116. The routine 800 then proceeds from operation 802 to operation 804, where the TMS 104 queries one or more of the processing agents 708-716 for data that can be utilized to optimize the requested translation.

From operation 804, the routine 800 proceeds to operation 806, where the processing agents request data from the data authority interface layer 702. In turn, the data authority interface layer 702 requests data from the data authorities 706A-706C at operation 808. Various mechanisms can be utilized in order to obtain the data from the data authorities 706. For example, and without limitation, the data authorities 706 can "push" the data 704 to the data authority interface layer 702. In another configuration, the data authority interface layer 702 can request the data 704 from the data authorities 706 such as, for instance, in response to requests received from the various processing agents like the TMS 104.

The routine 800 then proceeds from operation 808 to operation 810 where the processing agents receive the data from the data authority interface layer 702 and can perform various types of processing on the data. For example, and without limitation, the processing agents can perform human or machine translation, speech processing, neural network processing, sentiment mining, natural language processing, semantic processing, and/or other types of processing on the data 704. The processing agents can also perform various types of processing to categorize the data 704. For example, and without limitation, the processing agents can perform semantic processing, natural language processing, and/or neural network processing to categorize the data 704.

From operation 810, the routine 800 proceeds to operation 812, where the processing agents can expose the processed data to the TMS 104. The TMS 104 can then utilize the processed data to perform the translation request 116. Several examples of the manner in which the TMS 104 can utilized the processed data received from the processing agents to perform the requested translation were provided above with regard to FIG. 7. The routine 800 then proceeds from operation 812 to operation 814, where it ends.

Figure 9:
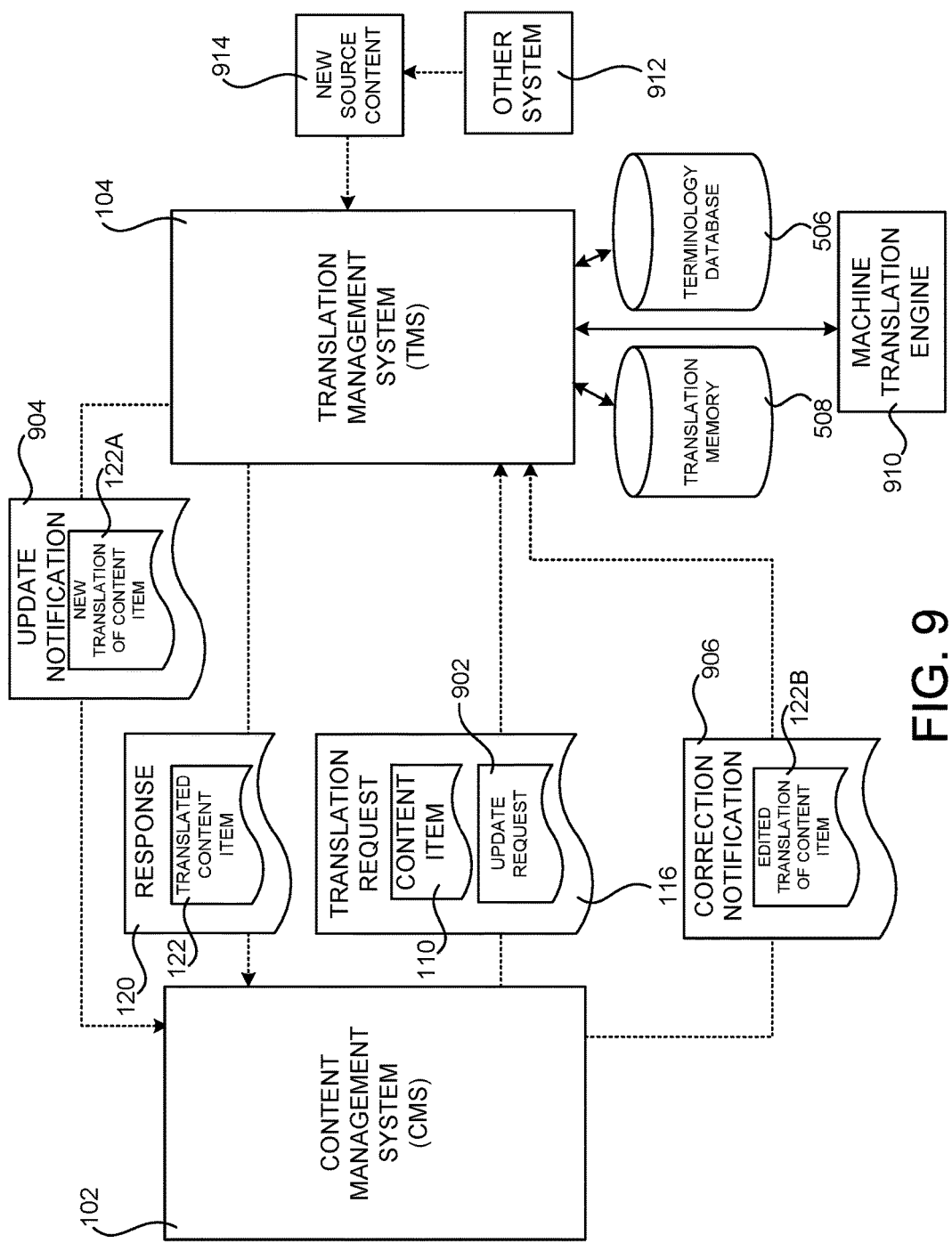
FIG. 9 is a computing system architecture diagram showing aspects of a computing system configured to perform continuous translation refinement with automated delivery of re-translated content, according to one particular configuration.

V. Continuous Translation Refinement with Automated Delivery of Re-Translated Content FIG. 9 is a computing system architecture diagram showing aspects of a computing system configured to perform continuous translation refinement with automated delivery of re-translated content, according to one particular configuration. As shown in FIG. 9, the TMS 104 can receive a request 116 to translate a content item 110 in the manner described above with regard to FIG. 1. In this example, however, the translation request 116 can also include an update request 902. The update request 902 is a request that the CMS 102 submitting the content item 110 for translation be notified if a better translation of the item becomes available from the TMS 104. In response thereto, the TMS 104 can initiate human or machine translation of the content item 110 set forth in the translation request 116, and return the translated content item 122 to the CMS 102 in a response 120.

It is to be appreciated that while FIG. 9 shows a translation request 116 that includes an update request 902, such an update request 902 can be specified in other ways in other configurations. For example, a user of the CMS 102 might configure the TMS 104 to provide updates to translations of certain types of content items 110. The update request 902 can be provided in other ways in other configurations. For instance, in one configuration updates to translations might only be provided if the monetary cost of retranslating a content item 110 does not exceed a preset value. A user might be permitted to specify the maximum cost they are willing to incur in order to receive a retranslation of a content item 110 following a change to the translation process utilized to translate the content item 110.

The TMS 104 can also store various types of data regarding the translation of the content item 110 including, but not limited to, the content item 110, the translated content item 122, and the identity of the CMS 102 that requested the translation. The TMS 104 can also store various types of data identifying the technologies or human beings utilized to translated the content item 110. For example, and without limitation, the TMS 104 might store data identifying the translation memory 508, the terminology database 506, the machine translation engine 910, the language and translation models, and/or the human translators that were utilized to generate the translated content item 122. Other types of data describing the translation of the content item 110 can be stored in other configurations. All of these resources (and potentially others) and the processes that utilize these resources to perform a translation might be referred to herein as a "translation process." This stored data is utilized to determine if changes have been made to the translation process utilized to translate the content item 110. The TMS 104 can also assign a unique identifier to the translation of the content item 110.

The TMS 104 can also continuously determine if the translation process utilized to translate the content item 110 has been modified. For example, and without limitation, the TMS 104 can continuously determine if the translation process utilized to translate the content item 110 has been modified in way that might result in a better translation of the content item 110. Modifications to the translation process that might result in a higher quality translation include, but are not limited to, modifications to various translation processes and algorithms such as segmentation algorithms, modifications to algorithms for exploding ICU syntax such as those described above, modifications to batching logic used by the TMS 104, modifications to the translation memory 508, to the terminology database 506, to the machine translation engine 910, to the TMS 104 itself such as routing or other types of algorithms or processes used by the TMS 104, to language or translation models utilized by the machine translation engine 910, receipt of new source content 914 from another computing system 912, and/or changes in the personnel utilized to perform a human translation of the content item 110. Other types of changes to the translation process might also trigger a re-translation of the content item 110 in the manner described below.

If the translation process (or any resources or algorithms utilized by the translation process) utilized by the TMS 104 to translate the content item 110 has been modified in any way that might result in a higher quality translation of the content item 110, the TMS 104 can generate a new translation 122A of the content item 110. If the new translation 122A of the content item is of a higher quality than the original translated content item 122, the TMS 104 can provide an update notification 904 to the CMS 102 with the new translation 122A of the content item 110 or instructing the CMS 102 to retrieve the new translation 122A of the content item 110.

As used herein, the term "quality" refers to an edit distance between a reference translation and a human or machine generated translation of the same content item 110. One mechanism for quantifying the quality of a human or machine translation is described in U.S. patent application Ser. No. 14/868,083, entitled "Optimized Statistical Machine Translation System With Rapid Adaptation Capability", which was filed on Sep. 28, 2015, and which is expressly incorporated herein by reference in its entirety. Other mechanisms for computing an estimate of the quality of a machine translation can also be utilized in other configurations.

In some examples, the CMS 102 can also supply a correction notification 906 to the TMS 104 that includes an edited translation 122B of the content item 110. The TMS 104 can update the translation memory 508 with the edited translation 122B of the content item 110 for use in improving future translations of the content item 110. As mentioned briefly above, these mechanisms can reduce the computational resources utilized when the CMS 102 continually polls the TMS 104 for an updated translation of a content item 110, and can also reduce the amount of time required for content creators to obtain higher quality translations of their content items. Additional details regarding these processes are provided below with regard to FIG. 10.

Figure 10:
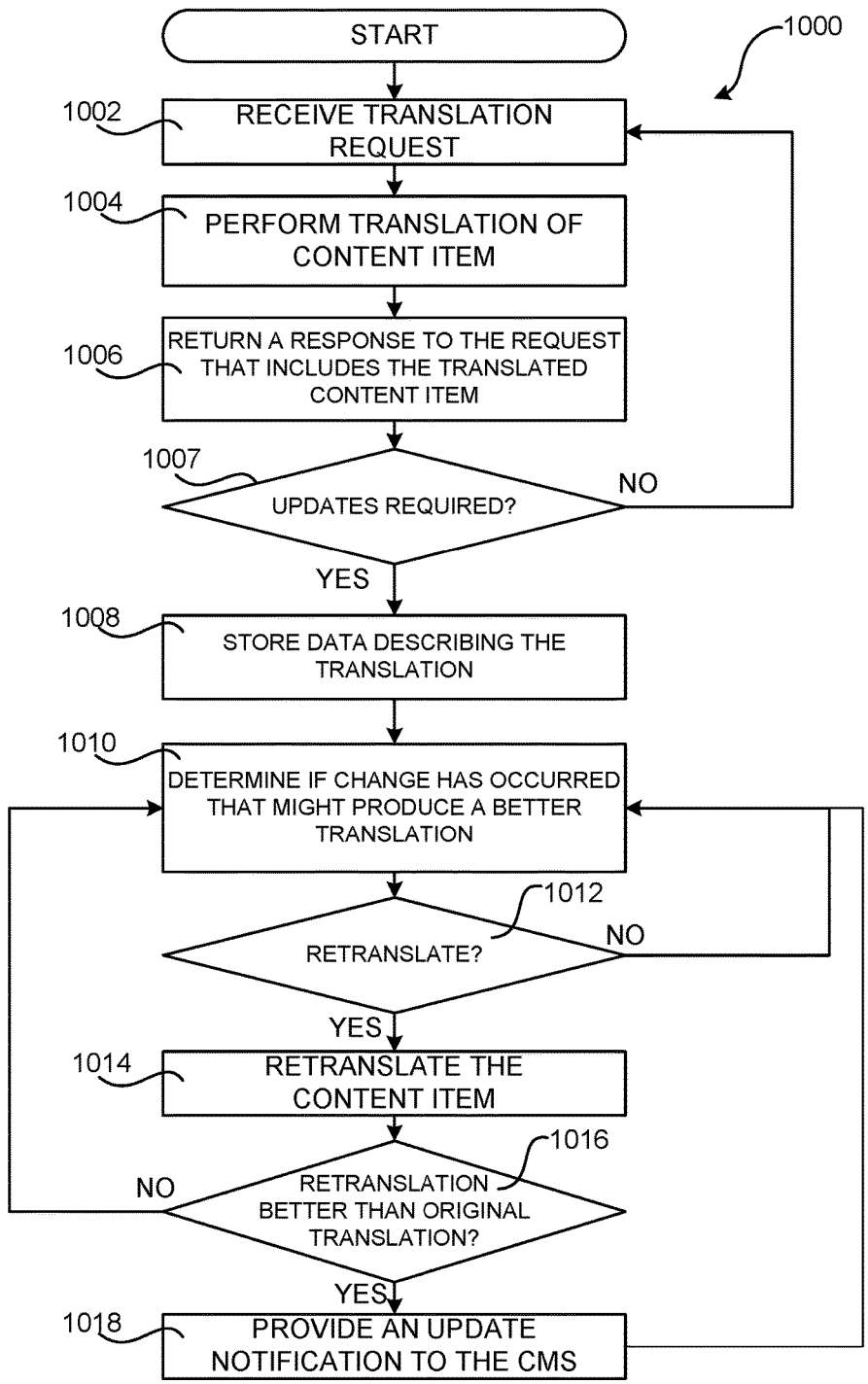
FIG. 10 is a flow diagram showing a routine that illustrates additional aspects of the operation of the computing system shown in FIG. 9 for providing continuous translation refinement with automated delivery of re-translated content, according to one particular configuration.

FIG. 10 is a flow diagram showing a routine 1000 that illustrates additional aspects of the operation of the computing system shown in FIG. 9 for providing continuous translation refinement with automated delivery of re-translated content according to one particular configuration. The routine 1000 begins at operation 1002, where the TMS 104 receives a request 116 to translate a content item 110. In response thereto, the routine 1000 proceeds from operation 1002 to operation 1004, where the TMS 104 initiates human or machine translation of the content item 110 set forth in the translation request 116. A response 120 including the translated content item 122 is returned to the CMS 102 at operation 1006.

From operation 1006, the routine 1000 proceeds to operation 1007, where the TMS determines whether updates to the translation generated at operation 1004 are required. As discussed briefly above, in some configurations the translation request 116 can also include an update request 902 that requests the CMS 102 be notified if a better translation of the content item 110 becomes available from the TMS 104. Alternately, a flag or preference might be set by a user of the TMS 104 indicating that updates are to be provided for certain content items 110. An update request 902 can be made in other ways in other configurations.

If an update request 902 has been supplied with the translation request 116 or if another type of request for updates has been made, the routine 1000 proceeds from operation 1007 to operation 1008. If a request for updates to the translated content item 110 has not been made, the routine 1000 proceeds back to operation 1002, where additional translation requests 116 can be processed in the manner described above.

At operation 1008, the TMS 104 stores various types of data regarding the translation of the content item 110. As mentioned above, this data can include, but is not limited to, the content item 110, the translated content item 122, and the identity of the CMS 102 that requested the translation. At operation 1008, the TMS 104 can also store various types of data identifying the technologies or human beings utilized to translated the content item 110. For example, and without limitation, the TMS 104 can store data identifying the translation memory 508, the terminology database 506, the machine translation engine 910, the language and translation models, and/or the human translators that were utilized to generate the translated content item 122. As discussed above, this data is utilized by the TMS 104 to determine if changes have been made to the translation process utilized to translate the content item 110.

From operation 1008, the routine 1000 proceeds to operation 1010, where the TMS 104 determines if a change has occurred that might produce a higher quality translation of the content item 110. As discussed above, modifications to the translation process that might result in a higher quality translation include, but are not limited to, modifications to the translation memory 508, to the terminology database 506, to the machine translation engine 910, to language or translation models utilized by the machine translation engine 910, change to processes utilized during translation such as a routing algorithm utilized by the TMS 104, and/or changes in the personnel utilized to perform a human translation of the content item 110. Other types of changes to the translation process might also trigger a re-translation of the content item 110.

From operation 1010, the routine 1000 proceeds to operation 1012, where a decision is made as to whether the content item 110 is to be retranslated. This decision can be made based upon whether the translation process utilized by the TMS 104 to translate the content item 110 has been modified in way that might result in a higher quality translation of the content item 110. This decision can also be made based upon other factors in other configurations. For example, and as discussed above, a user might specify a maximum cost that they are willing to incur to have the content item 110 retranslated. If the cost of retranslation is higher than the maximum cost specified by the user, then retranslation will not be performed. Other criteria can also be utilized to determine whether to retranslate the content item 110 in other configurations.

If the content item is not to be retranslated, the routine 1000 proceeds back to operation 1010, which was described above. If the content item is to be retranslated, the routine 1000 proceeds from operation 1012 to operation 1014, where the TMS 104 generates a new translation 122A of the content item 110. If the new translation 122A of the content item is of a higher quality than the original translated content item 122, the routine 1000 proceeds from operation 1016 to operation 1018, where the TMS 104 provides an update notification 904 to the CMS 102.

The update notification 904 can include the new translation 122A of the content item 110. Alternately, the update notification can instructing the CMS 102 to retrieve the new translation 122A of the content item 110 from the TMS 104. From operation 1018, the routine 1000 proceeds back to operation 1010, where the process described above can be continuously performed in order to provide updated translations of the content item 110 to the CMS 102 as modifications to the translation process are made.

Technologies are also disclosed herein for translation of search queries for use during search of a data store, such as a product database. For example, and without limitation, documents in a data store, such as records corresponding to products, can be expressed in one human-readable language (e.g. English). A user might wish to search the documents in the data store by providing search terms in another language (e.g. Spanish). In order to provide this functionality, the search terms can be translated from the language in which they are expressed into the language in which the documents in the data store are expressed (e.g. from Spanish to English). The translated search terms can then be utilized to search the data store. Results of the search can be presented in either language.

In some cases, however, user-provided search terms are ambiguous in such a way that results in multiple, different search results being returned. For instance, 'reloj' is a Spanish term that means both watch and clock. In this example, search results can be returned relating to both watches and clocks since it is unclear which type of time-keeping device the user was referring to. In order to resolve this ambiguity, search results for both types of items can be returned and presented to the user (e.g. search results for both clocks and watches in this case). In this way, the fact that translation ambiguity existed in the search query can be mitigated by providing search results relating to multiple translations of the search query having different meanings.

In another configuration, search terms submitted by various users can be collected over time. The most frequently submitted search terms can be identified and the most frequently submitted search terms can be provided to the TMS 104 for human translation. The human-generated translations can be stored and utilized when translating future search requests. This ensures the highest quality translation for the most frequently occurring searches.

In another configuration, analytics can be performed on search customer experience metrics to identify discrepancies in customer behavior and, in turn, translation problems with search terms. For example, in the e-commerce setting a particular product might have a certain purchase rate when information about the product is search and presented in the same language (e.g. English). However, if the purchase rate for the same product is much lower when search queries are translated and performed in the manner described above (e.g. from Spanish to English), this may be indicative of a problem with the translation of the search terms. This can trigger a retranslation of the search terms, such as by a human translator. Other types of search customer experience metrics can be utilized in other configurations.

Figure 11:
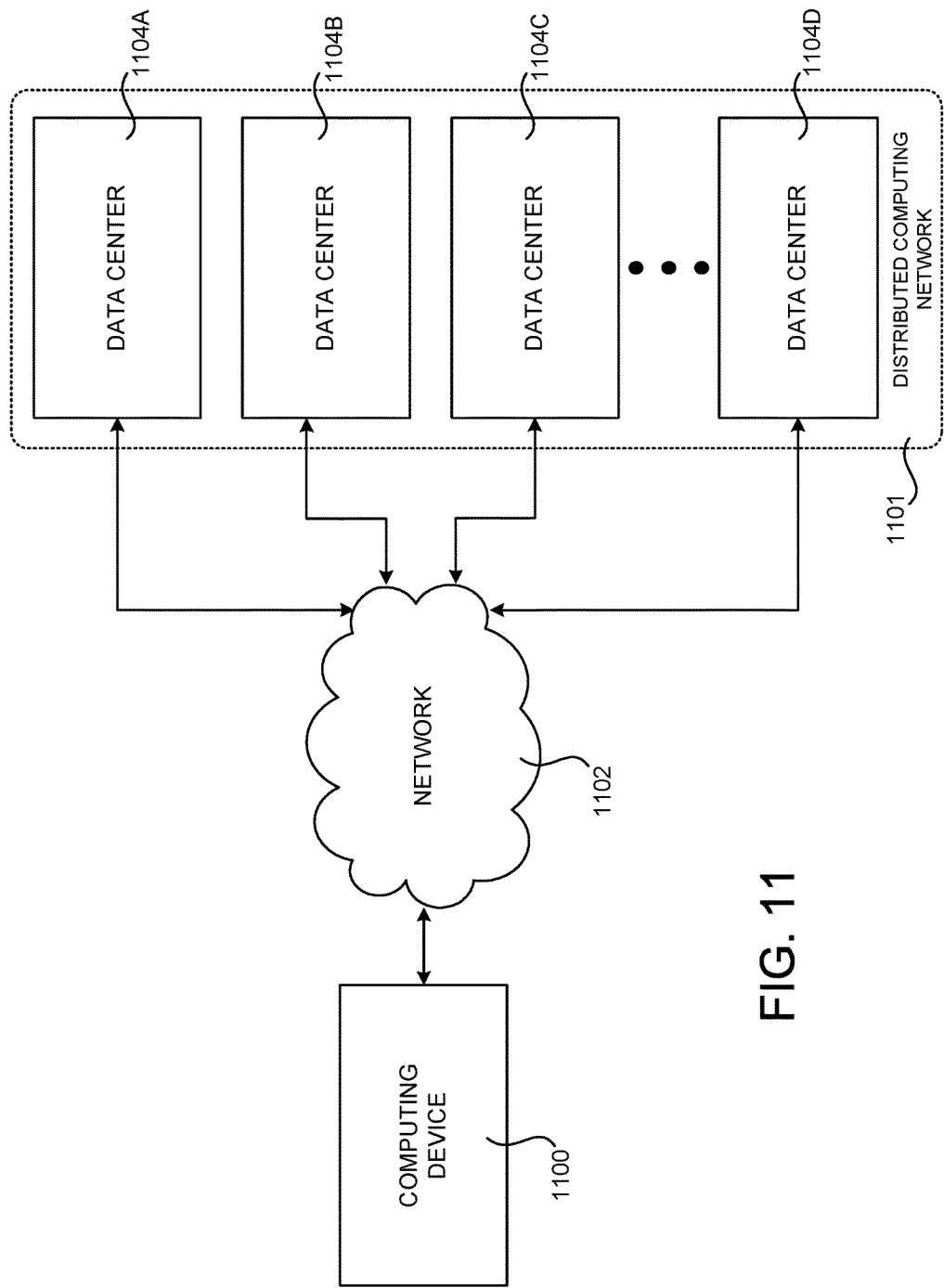
FIG. 11 is a system and network diagram that shows one illustrative operating environment for the configurations disclosed herein that includes a distributed computing network.

FIG. 11 is a system and network diagram that shows one illustrative operating environment for the configurations disclosed herein that includes a distributed computing network 1101 that can be configured to implement the various technologies described above. The distributed computing network 1101 can execute network services that provide computing resources on a permanent or an as-needed basis. Among other types of functionality, the computing resources provided by the distributed computing network 1101 can be utilized to implement the various software components described herein. The computing resources provided by the distributed computing network 1101 can include various types of computing resources, such as data processing resources like VM instances, data storage resources, networking resources, data communication resources, network services, and the like.

Each type of computing resource provided by the distributed computing network 1101 can be general-purpose or can be available in a number of specific configurations. For example, data processing resources can be available as physical computers or VM instances in a number of different configurations. The VM instances can be configured to execute applications, including Web servers, application servers, media servers, database servers, some or all of the software components described above, and/or other types of programs. Data storage resources can include file storage devices, block storage devices, and the like. The distributed computing network 1101 can also be configured to provide other types of computing resources not mentioned specifically herein.

As also discussed above, the computing resources provided by the distributed computing network 1101 are enabled in one implementation by one or more data centers 1104A-1104D (which might be referred to herein singularly as "a data center 1104" or in the plural as "the data centers 1104"). The data centers 1104 are facilities utilized to house and operate computer systems and associated components. The data centers 1104 typically include redundant and backup power, communications, cooling, and security systems. The data centers 1104 can also be located in geographically disparate locations. One illustrative configuration for a data center 1104 that can be utilized to implement the technologies disclosed herein will be described below with regard to FIG. 12.

Users of the distributed computing network 1101 can access the computing resources provided by the distributed computing network 1101 over a network 1102, which can be a wide area communication network ("WAN"), such as the Internet, an intranet or an Internet service provider ("ISP") network or a combination of such networks. For example, and without limitation, a computing device 1100 operated by a user of the distributed computing network 1101 can be utilized to access the distributed computing network 1101 by way of the network 1102. It should be appreciated that a local-area network ("LAN"), the Internet, or any other networking topology known in the art that connects the data centers 1104 to remote users can be utilized. It should also be appreciated that combinations of such networks can also be utilized.

Figure 12:
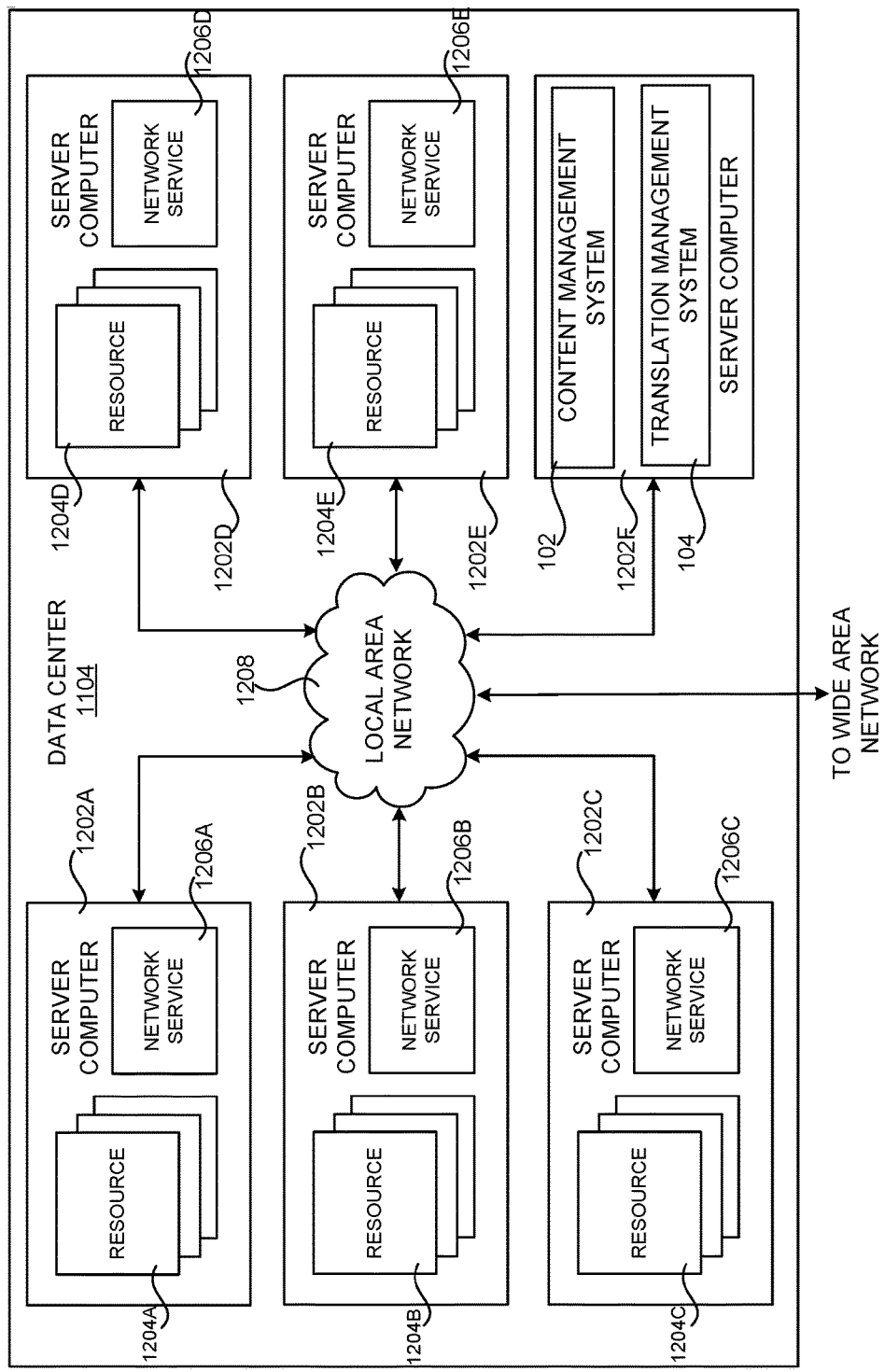
FIG. 12 is a computing system diagram illustrating a configuration for a data center that can be utilized to implement aspects of the technologies disclosed herein.

FIG. 12 is a computing system diagram that illustrates one configuration for a data center 1104 that implements aspects of the technologies disclosed herein. The example data center 1104 shown in FIG. 12 includes several server computers 1202A-1202F (which might be referred to herein singularly as "a server computer 1202" or in the plural as "the server computers 1202") for providing the computing resources 1204A-1204E.

The server computers 1202 can be standard tower, rack-mount, or blade server computers configured appropriately for providing the computing resources 1204 described herein (illustrated in FIG. 12 as the computing resources 1204A-1204E). As mentioned above, the computing resources 1204 provided by the distributed computing network 1101 can be data processing resources such as VM instances or hardware computing systems, data storage resources, database resources, networking resources, and others. Some of the servers 1202 can also be configured to execute network services 1206A-1206E, respectively, capable of instantiating, providing and/or managing the computing resources 1204.

The data center 1104 shown in FIG. 12 also includes a server computer 1202F that can execute some or all of the software components described above. For example, and without limitation, the server computer 1202F can be configured to execute the CMS 102 and/or the TMS 104, which were described in detail above. The server computer 1202F can also be configured to execute other components and/or to store data for providing some or all of the functionality described herein. In this regard, it should be appreciated that the various software components disclosed herein can execute on many other physical or virtual servers in the data centers 1104 in various configurations.

In the example data center 1104 shown in FIG. 12, an appropriate LAN 1208 is also utilized to interconnect the server computers 1202A-1202F. The LAN 1208 is also connected to the network 1102 illustrated in FIG. 11. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1104A-1104D, between each of the server computers 1202A-1202F in each data center 1104, and, potentially, between computing resources 1204 in each of the data centers 1104. It should be appreciated that the configuration of the data center 1104 described with reference to FIG. 12 is merely illustrative and that other implementations can be utilized.

Figure 13:
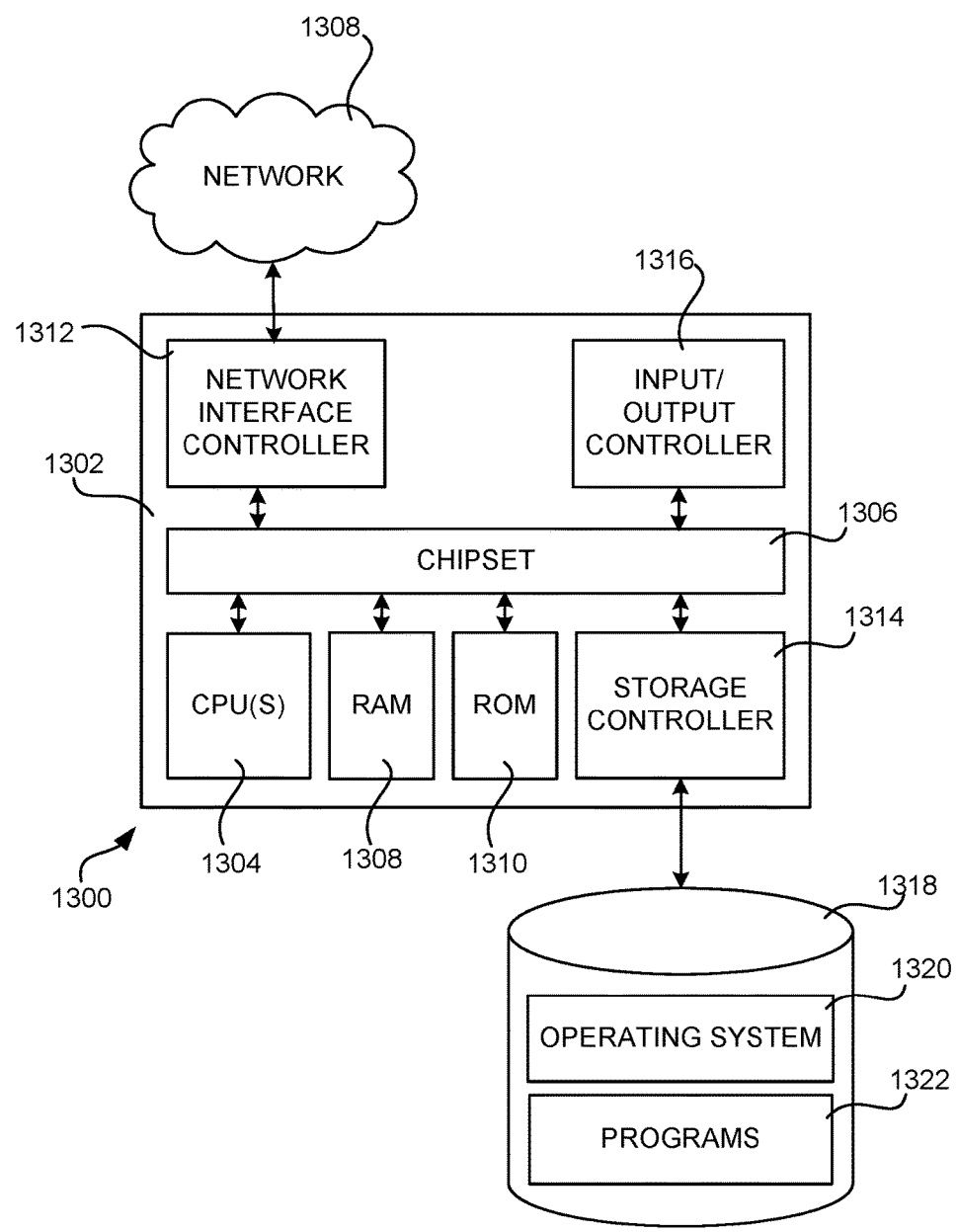
FIG. 13 is a computer architecture diagram showing an illustrative computer hardware architecture for implementing a computing device that can be utilized to implement aspects of the various technologies presented herein.

FIG. 13 shows an example computer architecture for a computer 1300 capable of executing program components for implementing the functionality described above. The computer architecture shown in FIG. 13 illustrates a conventional server computer, workstation, desktop computer, laptop, tablet, network appliance, e-reader, smartphone, or other computing device, and can be utilized to execute any of the software components presented herein.

The computer 1300 includes a baseboard 1302, or "motherboard," which is a printed circuit board to which a multitude of components or devices can be connected by way of a system bus or other electrical communication paths. In one illustrative configuration, one or more central processing units ("CPUs") 1304 operate in conjunction with a chipset 1306. The CPUs 1304 can be standard programmable processors that perform arithmetic and logical operations necessary for the operation of the computer 1300.

The CPUs 1304 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1306 provides an interface between the CPUs 1304 and the remainder of the components and devices on the baseboard 1302. The chipset 1306 can provide an interface to a RAM 1308, used as the main memory in the computer 1300. The chipset 1306 can further provide an interface to a computer-readable storage medium such as a read-only memory ("ROM") 1310 or non-volatile RAM ("NVRAM") for storing basic routines that help to startup the computer 1300 and to transfer information between the various components and devices. The ROM 1310 or NVRAM can also store other software components necessary for the operation of the computer 1300 in accordance with the configurations described herein.

The computer 1300 can operate in a networked environment using logical connections to remote computing devices and computer systems through a network, such as the network 1308. The chipset 1306 can include functionality for providing network connectivity through a NIC 1312, such as a gigabit Ethernet adapter. The NIC 1312 is capable of connecting the computer 1300 to other computing devices over the network 1308. It should be appreciated that multiple NICs 1312 can be present in the computer 1300, connecting the computer to other types of networks and remote computer systems.

The computer 1300 can be connected to a mass storage device 1318 that provides non-volatile storage for the computer. The mass storage device 1318 can store an operating system 1320, programs 1322, and data, which have been described in greater detail herein. The mass storage device 1318 can be connected to the computer 1300 through a storage controller 1314 connected to the chipset 1306. The mass storage device 1318 can consist of one or more physical storage units. The storage controller 1314 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1300 can store data on the mass storage device 1318 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1318 is characterized as primary or secondary storage, and the like.

For example, the computer 1300 can store information to the mass storage device 1318 by issuing instructions through the storage controller 1314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1300 can further read information from the mass storage device 1318 by detecting the physical states or characteristics of one or more particular locations within the physical storage units.

In addition to the mass storage device 1318 described above, the computer 1300 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1300.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1318 can store an operating system 1320 utilized to control the operation of the computer 1300. According to one configuration, the operating system comprises the LINUX operating system. According to another configuration, the operating system comprises the WINDOWS® SERVER operating system from MICROSOFT CORPORATION. According to further configurations, the operating system can comprise the UNIX operating system or one of its variants. It should be appreciated that other operating systems can also be utilized. The mass storage device 1318 can store other system or application programs and data utilized by the computer 1300.

In one configuration, the mass storage device 1318 or other computer-readable storage media is encoded with computer-executable instructions which, when loaded into the computer 1300, transform the computer from a general-purpose computing system into a special-purpose computer capable of implementing the configurations described herein. These computer-executable instructions transform the computer 1300 by specifying how the CPUs 1304 transition between states, as described above. According to one configuration, the computer 1300 has access to computer-readable storage media storing computer-executable instructions which, when executed by the computer 1300, perform the various processes described above with regard to FIGS. 1-10. The computer 1300 can also include computer-readable storage media for performing any of the other computer-implemented operations described herein.

The computer 1300 can also include one or more input/output controllers 1316 for receiving and processing input from a number of input devices, such as a keyboard, a mouse, a touchpad, a touch screen, an electronic stylus, or other type of input device. Similarly, an input/output controller 1316 can provide output to a display, such as a computer monitor, a flat-panel display, a digital projector, a printer, a plotter, or other type of output device. It will be appreciated that the computer 1300 might not include all of the components shown in FIG. 13, can include other components that are not explicitly shown in FIG. 13, or might utilize an architecture completely different than that shown in FIG. 13.

Based on the foregoing, it should be appreciated that technologies relating to leveraging content dimensions during language translation of content items, improving the translations of complex dynamic content by pre-rendering the content to remove localization-related syntax prior to machine or human translation, scoring source content as to its suitability for localization prior to machine or human translation, semantic and NLP processing for content categorization and routing, and continuous translation refinement with automated delivery of re-translated content have been presented herein.

It is also to be appreciated that the various technologies disclosed herein can be utilized to translate text strings in various contexts. For example, and without limitation, some of the technologies can be utilized to translate a search query from a first human-readable language (e.g. French) to a second human-readable language (e.g. English). The translated search query can then be utilized to perform a search over a corpora of documents in the second language (e.g. English). Results of the search can be presented to the user in the second language or translated to the first language for presentation to the user. The technologies disclosed herein can also be utilized to perform translations in other scenarios in other configurations.

Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

Clause 1. An apparatus, comprising: one or more processors; and one or more non-transitory computer-readable storage media having instructions stored thereupon which are executable by the one or more processors and which, when executed, cause the apparatus to: provide a user interface (UI) by way of the content management system (CMS) that includes at least one UI control for associating one or more content dimensions with a content item in the CMS; receive, by way of the UI, the one or more content dimensions associated with the content item; store the content dimensions associated with the content item at the CMS; provide a request to translate the content item to a translation management system (TMS), the request comprising the content item and the associated one or more content dimensions, the TMS having computer-executable instructions configured to utilize the associated one or more content dimensions during translation of the content item from a first language to a second language; receive a translation of the content item from the TMS and one or more content dimensions associated with the translation of the content item; and store the translation of the content item and the one or more content dimensions associated with the translation of the content item at the CMS.

Clause 2. The apparatus of clause 1, wherein the one or more non-transitory computer-readable storage media have further instructions stored thereupon to: specify that content items having a first content dimension are to be utilized when corresponding content items having a second content dimension are not present in the CMS; receive a request for a content item at the CMS; determine if the requested content item is present in the CMS having the second content dimension; and provide a content item having the first content dimension in response to the request for the content item in response to determining that the content item having the second dimension is not present in the CMS.

Clause 3. The apparatus of clauses 1 and 2, wherein the one or more non-transitory computer-readable storage media have further instructions stored thereupon to: receive a request to add, modify, or delete content dimensions for the content item at the TMS; and add, modify, or delete the content dimensions for the content item at the CMS.

Clause 4. The apparatus of clauses 1-3, wherein the TMS is configured to provide a user interface (UI) that includes at least one UI control for adding, modifying or deleting the content dimensions.

Clause 5. The apparatus of clauses 1-4, wherein the one or more non-transitory computer-readable storage media have further instructions stored thereupon to: receive a request from a rendering platform at the CMS for the translated content item; and provide the translated content item and the associated content dimensions to the rendering platform in response to the request, wherein the rendering platform is configured to utilize the associated content dimensions during rendering of the content item.

Clause 6. The apparatus of clauses 1-5, wherein the one or more non-transitory computer-readable storage media have further instructions stored thereupon to: receive one more additional content dimensions for the content item from the rendering platform; and associate the one or more additional content dimensions with the content item at the CMS.

Clause 7. The apparatus of clauses 1-6, wherein the content dimension defines a platform for the content item.

Clause 8. A computer-implemented method, comprising: receiving a request to translate a content item at a translation management system (TMS), the request comprising the content item and the associated content dimension, wherein the TMS has computer-executable instructions configured to utilize the associated content dimension during translation of the content item from a first language to a second language; generating a translation of the content item at the TMS system and a content dimension associated with the translation of the content item; and causing the translation of the content item and the content dimension associated with the translation of the content item to be stored.

Clause 9. The computer-implemented method of clause 8, wherein a content management system (CMS) is configured to provide a user interface (UI) for receiving the content dimension and to provide the request to translate the content item to the TMS.

Clause 10. The computer-implemented method of clauses 8 and 9, further comprising: specifying that content items having a first content dimension are to be utilized when corresponding content items having a second content dimension are not present at a content management system (CMS); receiving a request for a content item at the CMS; determining if the requested content item is present in the CMS having the second content dimension; and providing a content item having the first content dimension in response to the request for the content item in response to determining that the content item having the second dimension is not present in the CMS.

Clause 11. The computer-implemented method of clauses 8-10, further comprising: receiving a request to add, modify, or delete content dimensions for the content item at the TMS; and adding, modifying, or deleting the content dimensions for the content item at the CMS.

Clause 12. The computer-implemented method of clauses 8-11, wherein the TMS is configured to provide a user interface (UI) that includes at least one UI control for adding, modifying, or deleting the content dimensions.

Clause 13. The computer-implemented method of clauses 8-12, wherein the content dimension defines a platform for the content item.

Clause 14. The computer-implemented method of clauses 8-13, wherein the content dimension defines a style for the content item.

Clause 15. The computer-implemented method of clauses 8-14, wherein the content dimension defines a geographic region for the content item.

Clause 16. A non-transitory computer-readable storage media having instructions stored thereupon that are executable by one or more processors and which, when executed, cause the one or more processors to: associate a content dimension with a content item in a content management system (CMS); provide a request to translate the content item to a translation management system (TMS), the request comprising the content item and the associated content dimension, wherein the TMS has computer-executable instructions configured to utilize the associated content dimension during translation of the content item from a first language to a second language; receive a translation of the content item from the TMS system and a content dimension associated with the translation of the content item; and store the translation of the content item and the content dimension associated with the translation of the content item at the CMS.

Clause 17. The non-transitory computer-readable storage media of clause 16, wherein the non-transitory computer-readable storage media has further instructions stored thereupon to: specify that content items having a first content dimension are to be utilized when corresponding content items having a second content dimension are not present in the CMS; receive a request for a content item at the CMS; determine if the requested content item is present in the CMS having the second content dimension; and provide a content item having the first content dimension in response to the request for the content item in response to determining that the content item having the second dimension is not present in the CMS.

Clause 18. The non-transitory computer-readable storage media of clauses 16 and 17, wherein the non-transitory computer-readable storage media has further instructions stored thereupon to: receive an additional content dimension for the content item from the TMS; and associate the additional content dimension with the content item at the CMS.

Clause 19. The non-transitory computer-readable storage media of clauses 16-18, wherein the content dimension associated with the translation of the content item defines a quality of the translation of the content item.

Clause 20. The non-transitory computer-readable storage media of clauses 16-19, wherein the content dimension associated with the translation of the content item defines a pluralization of the translation of the content item.

Clause 21. An apparatus, comprising: one or more processors; and one or more non-transitory computer-readable storage media having instructions stored thereupon which are executable by the one or more processors and which, when executed, cause the apparatus to: receive, at a rendering engine, a content item having a localization-specific syntax; utilize the content item having the localization-specific syntax to generate one or more pre-rendered content items that do not have the localization-specific syntax; provide the pre-rendered content items that do not have the localization-specific syntax to a translation management system (TMS) for translation; receive from the TMS, at the rendering engine, one or more translated pre-rendered content items that do not have the localization-specific syntax; generate a translated content item having the localization-specific syntax from the one or more translated pre-rendered content items that do not have the localization-specific syntax; and provide the translated content item having the localization-specific syntax to a content management system (CMS).

Clause 22. The apparatus of clause 21, wherein the localization-specific syntax comprises variable-element placeholders.

Clause 23. The apparatus of clauses 21 and 22, wherein the variable-element placeholders represent plural language forms.

Clause 24. The apparatus of clauses 21-23, wherein the localization-specific syntax is expressed using International Component for Unicode (ICU) MessageFormat syntax.

Clause 25. The apparatus of clauses 21-24, wherein the translated pre-rendered content items that do not have the localization-specific syntax are generated by human translators.

Clause 26. The apparatus of clauses 21-25, wherein the translated pre-rendered content items that do not have the localization-specific syntax are generated by machine translation.

Clause 27. A computer-implemented method, comprising: receiving a content item containing localization-specific syntax; utilizing the content item containing the localization-specific syntax to generate one or more pre-rendered content items that do not contain the localization-specific syntax; translating the pre-rendered content items that do not have the localization-specific syntax to generate one or more translated pre-rendered content items that do not have the localization-specific syntax; generating a translated content item having the localization-specific syntax from the one or more translated pre-rendered content items that do not have the localization-specific syntax; and storing the translated content item having the localization-specific syntax.

Clause 28. The computer-implemented method of clause 27, wherein the localization-specific syntax comprises variable-element placeholders.

Clause 29. The computer-implemented method of clause 27 and 28, wherein the variable-element placeholders represent plural language forms.

Clause 30. The computer-implemented method of clauses 27-29, wherein the localization-specific syntax is expressed using International Component for Unicode (ICU) MessageFormat syntax.

Clause 31. The computer-implemented method of clauses 27-30, wherein the translated pre-rendered content items that do not have the localization-specific syntax are generated by human translators.

Clause 32. The computer-implemented method of clauses 27-31, wherein the translated pre-rendered content items that do not have the localization-specific syntax are generated by machine translation.

Clause 33. The computer-implemented method of clauses 27-32, wherein the content item containing localization-specific syntax is received at a rendering engine and wherein and translation management system (TMS) translates the pre-rendered content items that do not have the localization-specific syntax to generate the one or more translated pre-rendered content items that do not have the localization-specific syntax.

Clause 34. The computer-implemented method of clauses 27-33, wherein the rendering engine is further configured to perform content validation on the content item and to generate a corrected content item if errors are found in the content item.

Clause 35. A non-transitory computer-readable storage media having instructions stored thereupon that are executable by one or more processors and which, when executed, cause the one or more processors to: receive a content item containing localization-specific syntax; utilize the content item containing the localization-specific syntax to generate one or more pre-rendered content items that do not contain the localization-specific syntax; perform human or machine translation on the pre-rendered content items that do not have the localization-specific syntax to generate one or more translated pre-rendered content items that do not have the localization-specific syntax; generate a translated content item having the localization-specific syntax from the one or more translated pre-rendered content items that do not have the localization-specific syntax; and store the translated content item having the localization-specific syntax.

Clause 36. The non-transitory computer-readable storage media of clause 35, wherein the localization-specific syntax comprises variable-element placeholders.

Clause 37. The non-transitory computer-readable storage media of clause 35-36, wherein the variable-element placeholders represent plural language forms.

Clause 38. The non-transitory computer-readable storage media of clause 35-37, wherein the localization-specific syntax is expressed using International Component for Unicode (ICU) MessageFormat syntax.

Clause 39. The non-transitory computer-readable storage media of clause 35-38, wherein the translated pre-rendered content items that do not have the localization-specific syntax are generated by human translators.

Clause 40. The non-transitory computer-readable storage media of clause 35-39, wherein the translated pre-rendered content items that do not have the localization-specific syntax are generated by machine translation.

Clause 41. An apparatus, comprising: one or more processors; and one or more non-transitory computer-readable storage media having instructions stored thereupon which are executable by the one or more processors and which, when executed, cause the apparatus to: receive a request to perform human or machine translation of a content item expressed in a source language to a target language; responsive to the request, compute a source content localizability score (SCLS) for the content item; determine if the requested human or machine translation of the content item to the target language is to be performed based upon the SCLS; submit the content item to a translation management system (TMS) for human or machine translation of the content item into the target language responsive to determining that the content item is to be translated; and responsive to determining that the content item is not to be translated, reject the request to perform the human or machine translation of the content item.

Clause 42. The apparatus of clause 41, wherein the SCLS is computed, at least in part, based upon a comparison between the content item and a terminology database.

Clause 43. The apparatus of clauses 41-42, wherein the SCLS is computed, at least in part, based upon a comparison between the content item and a translation memory.

Clause 44. The apparatus of clauses 41-43, wherein the SCLS is computed, at least in part, using one or more rules.

Clause 45. The apparatus of clauses 41-44, wherein the one or more non-transitory computer-readable storage media have further instructions stored thereupon to generate a source content localizability report the source content localizability report comprising data identifying one or more suggestions for improving the SCLS responsive to determining that the content item is not to be translated.

Clause 46. The apparatus of clauses 41-45, wherein the one or more non-transitory computer-readable storage media have further instructions stored thereupon to compute the SCLS for the content item in response to receiving a request directed to a network services application programming interface (API).

Clause 47. A computer-implemented method, comprising: computing a source content localizability score (SCLS) for a content item; determining if a human or machine translation of the content item is to be performed based upon the SCLS; submitting the content item to a translation management system (TMS) for human or machine translation of the content item responsive to determining that the content item is to be translated; and responsive to determining that the content item is not to be translated, not submitting the content item to the TMS for human or machine translation.

Clause 48. The computer-implemented method of clause 47, wherein the SCLS is based, at least in part, on a comparison between the content item and a terminology database.

Clause 49. The computer-implemented method of clauses 47 and 48, wherein the SCLS is based, at least in part, on a comparison between the content item and a translation memory.

Clause 50. The computer-implemented method of clauses 47-49, wherein the SCLS is computed, at least in part, using one or more rules.

Clause 51. The computer-implemented method of clauses 47-50, wherein the SCLS is computed based, at least in part, on one or more language models.

Clause 52. The computer-implemented method of clauses 47-51, wherein the SCLS is computed based, at least in part, on one or more translation models.

Clause 53. The computer-implemented method of clauses 47-52, further comprising computing the SCLS for the content item in response to receiving a request directed to a network services application programming interface (API).

Clause 54. A non-transitory computer-readable storage media having instructions stored thereupon that are executable by one or more processors and which, when executed, cause the one or more processors to: compute a source content localizability score (SCLS) for a content item; determine if a human or machine translation of the content item is to be performed based upon the SCLS; submit the content item to a translation management system (TMS) for human or machine translation of the content item responsive to determining that the content item is to be translated; and prevent the content item from being submitted to the TMS for human or machine translation responsive to determining that the content item is not to be translated.

Clause 55. The non-transitory computer-readable storage media of clause 54, wherein the SCLS is computed, at least in part, based upon a comparison between the content item and a terminology database.

Clause 56. The non-transitory computer-readable storage media of clauses 54 and 55, wherein the SCLS is based, at least in part, on a comparison between the content item and a translation memory.

Clause 57. The non-transitory computer-readable storage media of clauses 54-56, wherein the SCLS is computed, at least in part, using one or more rules.

Clause 58. The non-transitory computer-readable storage media of clauses 54-57, having further instructions stored thereupon to generate a source content localizability report responsive to determining that the content item is not to be translated, the source content localizability report comprising data identifying one or more suggestions for improving the SCLS.

Clause 59. The non-transitory computer-readable storage media of clauses 54-58, wherein the SCLS for the content item is computed in response to receiving a request to perform a human or machine translation of the content item.

Clause 60. The non-transitory computer-readable storage media of clauses 54-59, having further instructions stored thereupon to compute the SCLS for the content item in response to receiving a request directed to a network services application programming interface (API).

Clause 61. An apparatus, comprising: one or more processors; and one or more non-transitory computer-readable storage media having instructions stored thereupon which are executable by the one or more processors and which, when executed, cause the apparatus to: receive a request at a translation management system (TMS) to perform a translation; responsive to the request, obtain data for use in performing the requested translation from one or more processing agents, wherein the processing agents are configured to obtain the data from a data authority interface layer, and wherein the data authority interface layer is configured to obtain the data from a plurality of data authorities; receive the data from the one or more processing agents; and utilize the data to perform the requested translation.

Clause 62. The apparatus of clause 61, wherein the plurality of data authorities comprise at least one content management system (CMS).

Clause 63. The apparatus of clauses 61 and 62, wherein the plurality of data authorities comprise at least one data warehouse.

Clause 64. The apparatus of clauses 61-63, wherein the data provided by at least one of the plurality of data authorities comprises product data.

Clause 65. The apparatus of clauses 61-64, wherein at least one of the processing agents is configured to perform natural language processing (NLP) on the data.

Clause 66. The apparatus of clauses 61-65, wherein at least one of the processing agents is configured to perform sentiment mining on the data.

Clause 67. The apparatus of clauses 61-66, wherein at least one of the processing agents is a neural network.

Clause 68. A computer-implemented method, comprising: receiving a request at a translation management system (TMS) to perform a translation; responsive to receiving the request, obtaining data for use in performing the requested translation from one or more processing agents, wherein the processing agents are configured to obtain the data from a data authority interface layer, and wherein the data authority interface layer is configured to obtain the data from a plurality of data authorities; receiving the data from the one or more processing agents; and utilizing the data to perform the requested translation.

Clause 69. The computer-implemented method of clause 68, wherein at least one of the plurality of data authorities comprises a content management system (CMS).

Clause 70. The computer-implemented method of clauses 68 and 69, wherein at least one of the plurality of data authorities comprises a data warehouse.

Clause 71. The computer-implemented method of clause 68-70, wherein at least one of the processing agents is configured to perform sentiment mining on the data.

Clause 72. The computer-implemented method of clause 68-71, wherein at least one of the processing agents is configured to perform speech processing on the data.

Clause 73. The computer-implemented method of clauses 68-72, wherein at least one of the processing agents is configured to perform natural language processing (NLP) on the data.

Clause 74. The computer-implemented method of clauses 68-73, wherein the data provided by at least one of the plurality of data authorities comprises product data.

Clause 75. A non-transitory computer-readable storage media having instructions stored thereupon that are executable by one or more processors and which, when executed, cause the one or more processors to: receive a request at a translation management system (TMS) to perform a translation; responsive to the request, obtain data for use in performing the requested translation from one or more processing agents, wherein the processing agents are configured to obtain the data from a data authority interface layer, and wherein the data authority interface layer is configured to obtain the data from a plurality of data authorities; receive the data from the one or more processing agents; and utilize the data to perform the requested translation.

Clause 76. The non-transitory computer-readable storage media of clause 75, wherein at least one of the plurality of data authorities comprises a data warehouse.

Clause 77. The non-transitory computer-readable storage media of clause 75 and 76, wherein at least one of the plurality of data authorities comprises a content management systems (CMS).

Clause 78. The non-transitory computer-readable storage media of clauses 75-77, wherein the data provided by at least one of the plurality of data authorities comprises product data.

Clause 79. The non-transitory computer-readable storage media of clauses 75-78, wherein at least one of the processing agents is configured to perform natural language processing (NLP) on the data.

Clause 80. The non-transitory computer-readable storage media of clause 75-79, wherein at least one of the processing agents is configured to perform speech processing on the data.

Clause 81. An apparatus, comprising: one or more processors; and one or more non-transitory computer-readable storage media having instructions stored thereupon which are executable by the one or more processors and which, when executed, cause the apparatus to: receive a request at a translation management system (TMS) to translate a content item from a content management system (CMS); cause an initial translation of the content item to be generated; return the initial translation of the content item to the CMS in response to the request; determine if a translation process used to translate the content item has been changed in a way that could result in a higher quality translation of the content item; generate a new translation of the content item responsive to determining that a change has been made to the translation process that could result in a higher quality translation of the content item; determine if the new translation of the content item is of a higher quality than the initial translation of the content item; and provide the new translation of the content item to the CMS if the new translation of the content item is of a higher quality than the initial translation of the content item.

Clause 82. The apparatus of clause 81, wherein the modification to the translation process that could result in a higher quality translation of the content item comprises a modification of a translation memory.

Clause 83. The apparatus of clauses 81 and 82, wherein the modification to the translation process that could result in a higher quality translation of the content item comprises a modification of a terminology database.

Clause 84. The apparatus of clauses 81-83, wherein the modification to the translation process that could result in a higher quality translation of the content item comprises a modification to a machine translation engine.

Clause 85. The apparatus of clauses 81-84, wherein the modification to the translation process that could result in a higher quality translation of the content item comprises a modification to one or more language or translation models utilized by a machine translation engine.

Clause 86. The apparatus of clauses 81-85, wherein the CMS is configured to provide an edited initial translation of the content item to the TMS.

Clause 87. The apparatus of clauses 81-86, wherein the request to translate the content item comprises an indication that the CMS is to be notified if the new translation of the content item is of a higher quality than the initial translation of the content item and the cost to retranslate the content item is below a user-specified maximum.

Clause 88. A computer-implemented method, comprising: receiving a request from a computing system to translate a content item; causing an initial translation of the content item to be generated using a translation process; returning the initial translation of the content item in response to the request; determining whether the content item is to be retranslated based upon one or more criteria; responsive to determining that the content item is to be retranslated, generating a new translation of the content item; and providing the new translation of the content item to the computing system.

Clause 89. The computer-implemented method of clause 88, wherein at least one of the one or more criteria comprises a modification of a translation memory.

Clause 90. The computer-implemented method of clauses 88 and 89, wherein at least one of the one or more criteria comprises a modification of a terminology database.

Clause 91. The computer-implemented method of clauses 88-90, wherein at least one of the one or more criteria comprises a modification to a machine translation engine.

Clause 92. The computer-implemented method of clauses 88-91, wherein at least one of the one or more criteria comprises a modification to one or more language or translation models utilized by a machine translation engine.

Clause 93. The computer-implemented method of clause 88-92, wherein at least one of the one or more criteria comprises an indication that a retranslation is to be performed if a cost of performing the retranslation is below a user-supplied maximum value.

Clause 94. The computer-implemented method of clause 88-93, wherein the request to translate the content item comprises an indication that the computing system is to be notified if the new translation of the content item is of a higher quality than the initial translation of the content item.

Clause 95. A non-transitory computer-readable storage media having instructions stored thereupon that are executable by one or more processors and which, when executed, cause the one or more processors to: receive a request from a computing system to translate a content item; cause an initial translation of the content item to be generated using a translation process; return the initial translation of the content item in response to the request; determine if the content item is to be retranslated based upon one or more criteria; generate a new translation of the content item responsive to determining that the content item is to be retranslated; and provide the new translation of the content item to the computing system.

Clause 96. The non-transitory computer-readable storage media of clause 95, wherein at least one of the one or more criteria comprises a modification of a translation memory.

Clause 97. The non-transitory computer-readable storage media of clauses 95 and 96, wherein the modification to the translation process that could result in a higher quality translation of the content item comprises a modification to a translation management system (TMS).

Clause 98. The non-transitory computer-readable storage media of clauses 95-97, wherein at least one of the one or more criteria modification to an algorithm utilized to translate the content item.

Clause 99. The non-transitory computer-readable storage media of clauses 95-98, wherein at least one of the one or more criteria comprises a modification to one or more language or translation models utilized by a machine translation engine.

Clause 100. The non-transitory computer-readable storage media of clauses 95-99, wherein the computing system is configured to provide an edited initial translation of the content item, and wherein the method further comprises updating a resource utilize to generate the initial translation based upon the edited initial translation.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus, comprising:
 one or more processors; and
 one or more non-transitory computer-readable storage media having instructions stored thereupon which are executable by the one or more processors and which, when executed, cause the apparatus to:
  receive a request at a translation management system (TMS) to translate a content item from a content management system (CMS), the request comprising the content item and an indication that the CMS is to be notified if a new translation of the content item is of a higher quality than an initial translation of the content item;
  cause the initial translation to be generated;
  return the initial translation to the CMS in response to the request;
  determine if a change to a translation process has been made that could result in the higher quality translation of the content item, wherein the change comprises at least one of a first modification of a translation memory of the TMS, a second modification to a machine translation engine configured to perform translations of content items, or a third modification to a language or a translation model used by the machine translation engine;
generate the new translation responsive to determining that the change has been made to the translation process;
determine if the new translation is of the higher quality than the initial translation; and
provide an update notification to a user associated with the CMS if the new translation is of the higher quality than the initial translation, the update notification comprising the new translation.

2. The apparatus of claim 1, wherein the instructions, when executed, further cause the apparatus to:
receive, from the CMS, a correction notification comprising an edited translation of the content item; and
updating the translation memory with the edited translation.

3. The apparatus of claim 1, wherein the change that has been made to the translation process that could result in the higher quality translation of the content item comprises a modification of a terminology database.

4. The apparatus of claim 1, wherein the instructions, when executed, further cause the apparatus to:
store translation process data identifying at least one of the translation memory, a terminology database that stores translations of terms and branding, the machine translation engine, the language model, or the translation model used to generate the initial translation.

5. The apparatus of claim 4, wherein determining if the change to the translation process has been made is based at least in part on the translation process data.

6. The apparatus of claim 1, wherein the CMS is configured to provide an edited initial translation of the content item to the TMS.

7. The apparatus of claim 1, wherein the request to translate the content item comprises an indication that the CMS is to be notified if a cost to retranslate the content item is below a user-specified maximum.

8. A computer-implemented method, comprising:
receiving a request from a computing system to translate a content item, the request comprising the content item and an indication that the computing system is to be notified if a new translation of the content item is of a higher quality than an initial translation of the content item;
causing the initial translation to be generated using a translation process;
returning the initial translation in response to the request;
determining whether a change to a translation process has been made that could result in the higher quality translation of the content item, wherein the change comprises at least one of a first modification of a translation memory of a translation management system (TMS) configured to facilitate translations of human readable text, a second modification to a machine translation engine configured to perform translations of content items, or a third modification to a language or a translation model used by the machine translation engine;
responsive to determining that the change has been made to the translation process, generating the new translation;
determining that the new translation is of the higher quality than the initial translation; and
responsive to determining that the new translation is of the higher quality, providing a notification comprising the new translation to a user associated with the computing system.

9. The computer-implemented method of claim 8, wherein providing the new translation to the user associated with the computing system comprises instructing the computing system to retrieve the new translation from the TMS.

10. The computer-implemented method of claim 8, wherein at least one of the one or more criteria comprises a modification of a terminology database.

11. The computer-implemented method of claim 8 further comprising:
receiving, from the computing system, a correction notification comprising an edited translation of the content item.

12. The computer-implemented method of claim 11, further comprising:
updating the translation memory with the edited translation.

13. The computer-implemented method of claim 8, wherein at least one of the one or more criteria comprises a second indication that a retranslation is to be performed if a cost of performing the retranslation is below a user-specified maximum.

14. The computer-implemented method of claim 8, wherein the request to translate the content item comprises an indication that the computing system is to be notified if a cost to retranslate the content item is below a user-specified maximum.

15. A non-transitory computer-readable storage media having instructions stored thereupon that are executable by one or more processors and which, when executed, cause the one or more processors to:
receive a request from a computing system to translate a content item, the request comprising the content item and an indication that the computing system is to be notified if a new translation of the content item is of a higher quality than an initial translation of the content item;
cause the initial translation to be generated using a translation process;
return the initial translation in response to the request;
determine if a change to a translation process has been made that could result in the higher quality translation of the content item, wherein the change comprises at least one of a first modification of a translation memory of a translation management system (TMS) configured to facilitate translations of human readable text, a second modification to a machine translation engine configured to perform translations of content items, or a third modification to a language or a translation model used by the machine translation engine;
generate the new translation responsive to determining that the content item is to be retranslated;
determine that the new translation is of the higher quality than the initial translation; and
provide a notification comprising the new translation to a user associated with the computing system responsive to determining that the new translation is of the higher quality.

16. The non-transitory computer-readable storage media of claim 15, wherein providing the new translation to the user associated with the computing system comprises instructing the computing system to retrieve the new translation from the TMS.

17. The non-transitory computer-readable storage media of claim 15, wherein at least one of the one or more criteria comprises a modification to a translation management system (TMS).

18. The non-transitory computer-readable storage media of claim 15, wherein the request further comprises a cost threshold indicating that a cost to generate the new translation is to be below the cost threshold.

19. The non-transitory computer-readable storage media of claim 18, wherein the instructions, when executed, further cause the one or more processors to:
  determine that the cost to generate the new translation is below the cost threshold; and
  wherein generating the new translation is further responsive to determining that the cost to generate the new translation is below the cost threshold.

20. The non-transitory computer-readable storage media of claim 16, wherein the instructions, when executed, further cause the one or more processors to:
  receive a correction notification from the computing system, the correction notification comprising an edited translation of the content item; and
  modifying the translation memory with the edited translation.

* * * * *